(12) United States Patent
Buchholz et al.

(10) Patent No.: US 7,535,861 B2
(45) Date of Patent: May 19, 2009

(54) SELF-CONTAINED PORTABLE BROADBAND COMMUNICATION SYSTEM

(75) Inventors: Ampy Buchholz, Tualatin, OR (US); Jim Barber, Beaverton, OR (US); Bob Forman, Tigard, OR (US); Christopher J. Hoffmann, Portland, OR (US); Robert Frisbee, Lake Oswego, OR (US); Charlie Kawasaki, Portland, OR (US); Kevin O'Connor, Portland, OR (US)

(73) Assignee: Pacific Star Communications Inc., Portland, OR (US)

( * ) Notice: Subject to any disclaimer, the term of this patent is extended or adjusted under 35 U.S.C. 154(b) by 130 days.

(21) Appl. No.: 11/544,224

(22) Filed: Oct. 6, 2006

(65) Prior Publication Data

US 2007/0109984 A1 May 17, 2007

Related U.S. Application Data

(60) Provisional application No. 60/724,947, filed on Oct. 7, 2005, provisional application No. 60/775,315, filed on Feb. 21, 2006, provisional application No. 60/775,300, filed on Feb. 21, 2006.

(51) Int. Cl.
 H04B 7/00 (2006.01)
(52) U.S. Cl. .................. 370/310; 370/328; 370/318; 370/310.2; 455/556.1; 455/575.1
(58) Field of Classification Search .......... 370/310, 370/227, 328, 338, 466, 352, 311, 318, 400–401; 455/418–420, 403, 428, 424–425, 550.1, 455/552.2, 426.1–426.2, 554.1–556.1, 560, 455/575.1–575.8; 361/690, 676, 678, 679, 361/687, 694–695; 725/62–63
See application file for complete search history.

(56) References Cited

U.S. PATENT DOCUMENTS

| | | | |
|---|---|---|---|
| 4,674,004 A | 6/1987 | Smith et al. |
| 4,972,453 A | 11/1990 | Daniel, III et al. |
| 5,081,707 A | 1/1992 | Schorman et al. |
| 5,159,685 A | 10/1992 | Kung |
| 5,197,127 A | 3/1993 | Waclawsky et al. |
| 5,317,725 A | 5/1994 | Smith et al. |

(Continued)

FOREIGN PATENT DOCUMENTS

| | | |
|---|---|---|
| WO | WO 99/59276 | 11/1999 |
| WO | WO-02/091692 | 11/2002 |
| WO | WO-2004/085622 | 10/2004 |
| WO | WO 2007/044880 A2 | 4/2007 |

OTHER PUBLICATIONS

Banton, Randy and Jaenicke, Richard. "Finely Managed Air Cooling for Deployed Military Environments." Cots Journal. Nov. 2003. 4 Pages.

Primary Examiner—Kamran Afshar
(74) Attorney, Agent, or Firm—Perkins Coie LLP

(57) ABSTRACT

Systems and methods for establishing IT services in edge environments are described. The system comprises a transportable housing capable of being carried by personnel, a plurality of commercial off-the-shelf components contained in the housing and coupled together and configured to provide the broadband communications network, a software management system operatively coupled to the plurality of components, a network connection subsystem defined by at least a first portion of the plurality of components and configured to establish access to the broadband communications network, and a connection subsystem defined by at least a second portion of the plurality of components and that provides a user with a connection to the broadband communications network via the network connection subsystem.

22 Claims, 14 Drawing Sheets

U.S. PATENT DOCUMENTS

| | | |
|---|---|---|
| 5,377,196 A | 12/1994 | Godlew et al. |
| 5,388,189 A | 2/1995 | Kung |
| 5,422,787 A | 6/1995 | Gourdine |
| 5,508,941 A | 4/1996 | Leplingard et al. |
| 5,559,673 A | 9/1996 | Gagnon et al. |
| 5,657,641 A | 8/1997 | Cunningham et al. |
| 5,774,331 A | 6/1998 | Sach |
| 5,808,866 A | 9/1998 | Porter |
| 5,872,557 A | 2/1999 | Wiemer et al. |
| 5,875,242 A | 2/1999 | Glaser et al. |
| 5,917,904 A | 6/1999 | Theis |
| 5,974,457 A | 10/1999 | Waclawsky et al. |
| 5,995,376 A | 11/1999 | Schultz et al. |
| 6,003,068 A | 12/1999 | Sopko |
| 6,021,042 A | 2/2000 | Anderson et al. |
| 6,064,571 A | 5/2000 | Noble |
| 6,094,346 A | 7/2000 | Schweers et al. |
| 6,111,192 A | 8/2000 | Bell et al. |
| 6,130,819 A | 10/2000 | Lofland et al. |
| 6,185,481 B1 | 2/2001 | Kondou et al. |
| 6,198,628 B1 | 3/2001 | Smith |
| 6,202,291 B1 | 3/2001 | Toedtman |
| 6,206,480 B1 | 3/2001 | Thompson |
| 6,229,698 B1 | 5/2001 | Harvey |
| 6,242,691 B1 | 6/2001 | Reese et al. |
| 6,280,318 B1 | 8/2001 | Criss-Puszkiewicz et al. |
| 6,330,152 B1 | 12/2001 | Vos et al. |
| 6,345,294 B1 | 2/2002 | O'Toole et al. |
| 6,360,276 B1 | 3/2002 | Scott |
| 6,422,730 B1 | 7/2002 | Koren et al. |
| 6,434,120 B1 | 8/2002 | Natarajan et al. |
| 6,437,980 B1 | 8/2002 | Casebolt |
| 6,438,577 B1 | 8/2002 | Owens |
| 6,487,664 B1 | 11/2002 | Kellum |
| 6,499,609 B2 | 12/2002 | Patriche et al. |
| 6,525,935 B2 | 2/2003 | Casebolt |
| 6,525,936 B2 | 2/2003 | Beitelmal et al. |
| 6,529,502 B2 | 3/2003 | Sarkissian et al. |
| 6,535,865 B1 | 3/2003 | Skaaning et al. |
| 6,538,881 B1 | 3/2003 | Jeakins et al. |
| 6,545,863 B2 | 4/2003 | Huggins |
| 6,552,898 B1 | 4/2003 | Noble |
| 6,567,267 B1 | 5/2003 | Wang et al. |
| 6,574,104 B2 | 6/2003 | Patel et al. |
| 6,587,335 B1 | 7/2003 | Nelson et al. |
| 6,598,183 B1 | 7/2003 | Grieco et al. |
| 6,603,662 B1 | 8/2003 | Ganrot |
| 6,614,811 B1 | 9/2003 | Alaimo et al. |
| 6,646,878 B2 | 11/2003 | Chan |
| 6,647,015 B2 | 11/2003 | Malkemes et al. |
| 6,661,657 B1 | 12/2003 | Banton et al. |
| 6,661,667 B2 | 12/2003 | Robbins et al. |
| 6,683,787 B1 | 1/2004 | Banton et al. |
| 6,690,575 B1 | 2/2004 | Banton et al. |
| 6,691,250 B1 | 2/2004 | Chandiramani et al. |
| 6,697,255 B1 | 2/2004 | Banton et al. |
| 6,704,196 B1 | 3/2004 | Rodriguez et al. |
| 6,719,149 B2 | 4/2004 | Tomino |
| 6,741,463 B1 | 5/2004 | Akhtar et al. |
| 6,741,466 B1 | 5/2004 | Lebo |
| 6,747,872 B1 | 6/2004 | Patel et al. |
| 6,751,096 B2 | 6/2004 | Aldon |
| 6,759,588 B1 | 7/2004 | Banton et al. |
| 6,760,218 B2 | 7/2004 | Fan et al. |
| 6,765,793 B2 | 7/2004 | Kehret et al. |
| 6,781,831 B1 | 8/2004 | Banton et al. |
| 6,792,323 B2 | 9/2004 | Krzyzanowski et al. |
| 6,795,318 B2 | 9/2004 | Haas et al. |
| 6,801,428 B2 | 10/2004 | Smith et al. |
| 6,826,708 B1 | 11/2004 | Michalewicz |
| 6,853,637 B1 | 2/2005 | Norrell et al. |
| 6,856,816 B2 | 2/2005 | Porter |
| 6,857,012 B2 | 2/2005 | Sim et al. |
| 6,862,179 B2 | 3/2005 | Beitelmal et al. |
| 6,876,548 B2 | 4/2005 | Yatougo et al. |
| 6,876,736 B2 | 4/2005 | Lamy et al. |
| 6,879,486 B1 | 4/2005 | Banton et al. |
| 6,879,973 B2 | 4/2005 | Skaanning et al. |
| 6,889,376 B1 | 5/2005 | Barritz et al. |
| 6,906,918 B2 | 6/2005 | Rabinovitz |
| 6,909,611 B2 | 6/2005 | Smith et al. |
| 6,924,978 B2 | 8/2005 | DiStefano |
| 6,944,022 B1 | 9/2005 | Kehret et al. |
| 6,967,841 B1 | 11/2005 | Chu et al. |
| 6,968,958 B2 | 11/2005 | Lauchner et al. |
| 6,985,357 B2 | 1/2006 | Cauthron |
| 6,990,661 B2 | 1/2006 | Dobbek |
| 6,993,614 B2 | 1/2006 | Le et al. |
| 6,995,978 B2 | 2/2006 | Strauss et al. |
| 7,002,793 B2 | 2/2006 | Imsand |
| 7,012,805 B2 | 3/2006 | Shah et al. |
| 7,023,693 B2 | 4/2006 | Yuan et al. |
| 2001/0008482 A1 | 7/2001 | Corisis et al. |
| 2002/0061024 A1 | 5/2002 | Malkemes et al. |
| 2002/0072345 A1 | 6/2002 | Toth et al. |
| 2002/0114325 A1 | 8/2002 | Dale et al. |
| 2002/0161873 A1 | 10/2002 | McGuire |
| 2002/0167935 A1 | 11/2002 | Nabkel et al. |
| 2002/0176404 A1 | 11/2002 | Girard |
| 2003/0041237 A1 | 2/2003 | Mcelroy et al. |
| 2003/0051008 A1 | 3/2003 | Gorthy et al. |
| 2003/0137532 A1 | 7/2003 | Proulx et al. |
| 2003/0150823 A1 | 8/2003 | Dean et al. |
| 2003/0161453 A1 | 8/2003 | Veschi |
| 2003/0214782 A1 | 11/2003 | Osborn et al. |
| 2003/0235198 A1 | 12/2003 | McElroy et al. |
| 2004/0001088 A1 | 1/2004 | Stancil et al. |
| 2004/0003073 A1 | 1/2004 | Krzyzanowski et al. |
| 2004/0008717 A1 | 1/2004 | Verma et al. |
| 2004/0089618 A1 | 5/2004 | Lauchner et al. |
| 2004/0111574 A1 | 6/2004 | Pina et al. |
| 2004/0111598 A1 | 6/2004 | Jordan et al. |
| 2004/0111599 A1 | 6/2004 | Jordan et al. |
| 2004/0125558 A1 | 7/2004 | DiStefano |
| 2004/0130557 A1 | 7/2004 | Lin et al. |
| 2004/0131172 A1 | 7/2004 | Gill |
| 2004/0133734 A1 | 7/2004 | Jordan et al. |
| 2004/0133888 A1 | 7/2004 | Ard et al. |
| 2004/0136373 A1 | 7/2004 | Bareis |
| 2004/0142711 A1 | 7/2004 | Mahonen et al. |
| 2004/0165544 A1 | 8/2004 | Cornett et al. |
| 2004/0180653 A1* | 9/2004 | Royalty ...................... 455/431 |
| 2004/0190229 A1 | 9/2004 | Caci et al. |
| 2004/0198386 A1 | 10/2004 | Dupray |
| 2004/0215999 A1 | 10/2004 | Otto et al. |
| 2005/0047098 A1 | 3/2005 | Garnett et al. |
| 2005/0054289 A1 | 3/2005 | Salazar et al. |
| 2005/0060543 A1 | 3/2005 | Anspach |
| 2005/0089052 A1 | 4/2005 | Chen et al. |
| 2005/0099766 A1 | 5/2005 | Fraley et al. |
| 2005/0128689 A1 | 6/2005 | Caci et al. |
| 2005/0168926 A1 | 8/2005 | Lee et al. |
| 2005/0188092 A1 | 8/2005 | Short et al. |
| 2005/0198233 A1 | 9/2005 | Manchester et al. |
| 2005/0198239 A1 | 9/2005 | Hughes |
| 2005/0199459 A1 | 9/2005 | Harvey |
| 2005/0201053 A1 | 9/2005 | Scicluna et al. |
| 2005/0213306 A1 | 9/2005 | Vos et al. |
| 2005/0232284 A1 | 10/2005 | Karaoguz et al. |
| 2005/0237716 A1 | 10/2005 | Chu et al. |
| 2005/0248043 A1 | 11/2005 | Bettridge et al. |
| 2005/0254210 A1 | 11/2005 | Grady et al. |
| 2005/0259383 A1 | 11/2005 | Ewing et al. |
| 2006/0015674 A1 | 1/2006 | Murotake |

| | | |
|---|---|---|
| 2006/0018094 A1 | 1/2006 | Robbins et al. |
| 2006/0019655 A1 | 1/2006 | Peacock |
| 2006/0022562 A1 | 2/2006 | Li |
| 2006/0026509 A1 | 2/2006 | Porter |
| 2006/0034053 A1 | 2/2006 | Parish et al. |
| 2006/0044775 A1 | 3/2006 | Hoshino et al. |
| 2006/0050477 A1 | 3/2006 | Wu et al. |
| 2006/0071581 A1 | 4/2006 | Harvey |
| 2006/0133033 A1 * | 6/2006 | Straub et al. ............... 361/690 |
| 2006/0251115 A1 * | 11/2006 | Haque et al. ............... 370/466 |
| 2007/0058339 A1 | 3/2007 | Hoffman et al. |
| 2007/0204324 A1 * | 8/2007 | Roberts et al. ............... 726/1 |

* cited by examiner

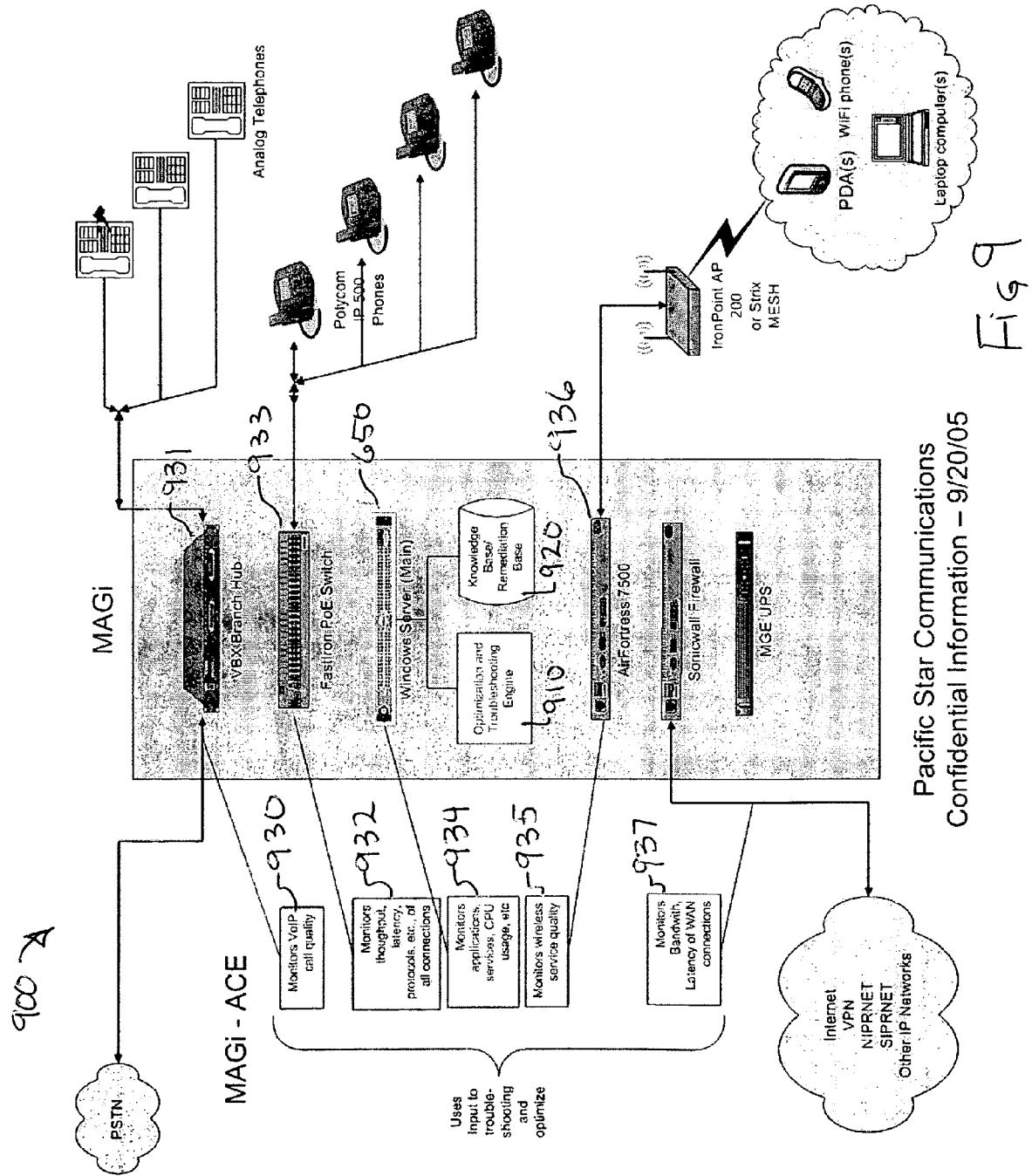

SELF-CONTAINED PORTABLE BROADBAND COMMUNICATION SYSTEM

CROSS-REFERENCE TO RELATED APPLICATIONS

This application claims priority to U.S. Provisional Patent Application No. 60/724,947, entitled "Deployable and Mobile Broadband Communications and Data Appliance," filed Oct. 7, 2005; U.S. Provisional Patent Application No. 60/775,315, entitled "Flexi-Case Assembly" filed Feb. 21, 2006; U.S. Provisional Patent Application No. 60/775,300, entitled "Wizard-driven Configuration Management Software for Deployable and Mobile Broadband Communications and Data Appliance," filed Feb. 21, 2006; and U.S. patent application Ser. No. 11/435,355, entitled "High Velocity Air Cooling for Electronic Equipment," filed May 16, 2006, all of which are incorporated herein by reference thereto.

BACKGROUND

There are many environments without a surrounding communications/data infrastructure required to support communications and information services equipment, such as equipment used to access a network or conduct phone calls. These environments include battlefields, harsh environments, disaster areas, buildings, construction areas, and so on.

As more facilities, companies, and organizations rely on IT and communications equipment to perform daily operations, there is a need to provide access in these environments. However, current attempts fail because many of the environments are inaccessible and transporting large quantities of equipment to the environment may be problematic or not feasible. For example, large amounts of equipment are more likely to be damaged during shipping, handling, setting up, or taking down of the equipment in a battlefield or disaster area. Environmental factors may also damage equipment. These factors may include heat, rain, wind, dust, vibrations, and/or rough handling.

Also, large quantities of equipment are generally more time-consuming expensive to install, set up, and maintain. The equipment may require many skilled technicians to assist in the installation and setup, adding further costs and problems. These systems may also require technicians to assist in configuration, security, monitoring, and maintenance of the equipment even after the initial set up. Additionally, it may be difficult to bring technicians and other skilled persons to some of the environments that require such IT and communications equipment.

Other problems associated with complex or sophisticated equipment may be a time consuming setup and configuration of the system, expensive or large power needs, expensive customization in design and security of a system, and so on. These and other problems exist in providing a computing, communications, and networking infrastructure in "edge" environments.

BRIEF DESCRIPTION OF THE DRAWINGS

FIG. 9 is a block diagram illustrating an autonomous computing engine.

Figure 1:
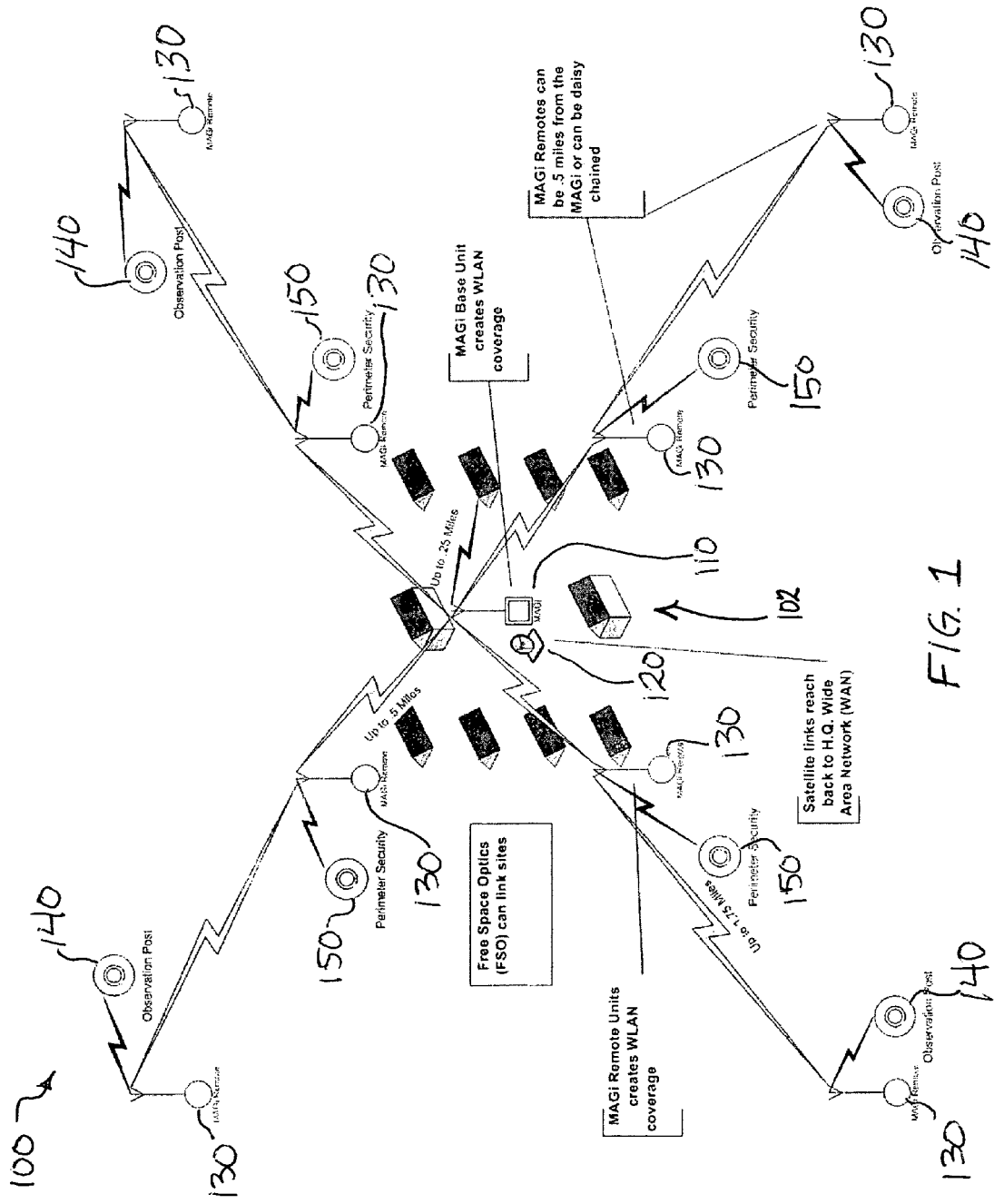
FIG. 1 is a block diagram of the system and its deployment in a suitable environment in accordance with an embodiment of the present invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

DETAILED DESCRIPTION

Aspects of the system in accordance with an embodiment of the present invention provide an appliance with a set of IT and communications services in an inexpensive, mobile, wired and/or wireless, environmentally resistant, easy to set up and administer package containing commercial off-the-shelf (COTS) components. The system minimizes the costs, time, and expertise required to deploy complete networking and computing infrastructure in "edge" environments by providing a comprehensive suite of networking, communications, and computational resources. "Edge" environments include, for example, geographical, economical, or temporal environments where network and computing resources are unavailable or are insufficiently capable of meeting the needs of organizations or individuals in such locations.

In one embodiment, the system provides a durable, transportable, mobile appliance with COTS components operatively coupled together to provide a broadband communications network that supports, as an example, Data, PBX, Voice, or Local Area Network (LAN) and/or Wide Area Network (WAN) communications for multiple users (e.g., over 100 users). The appliance includes an easily transportable, rugged, environmentally hardened case (or cases) that contains and protects the COTS components from shock, vibration, dirt, dust, heat, rain, water, wind, and other harsh or potentially damaging environmental conditions. In some cases, the system provides cooling equipment configured to cool the COTS components while operating in a high-temperature environment.

The COTS components are operatively coupled together in the case and configured to work together to provide a set of users with a preconfigured data/communications system requiring minimal user setup upon deployment. The appliance includes integrated software that may automatically set up, configure, maintain, monitor, and diagnose the COTS components, further reducing the need for on-site IT technicians.

The appliance in one embodiment provides computer-based wired and wireless communications (such as digital voice, data, and video), data networks, broadband data transmission, network access, network transmission, application services, data storage and security, and other "IT and communications services" delivered through "IT and/or communications equipment." In some aspects, the appliance provides such storage, access, and transmission services in "edge" environments on a temporary, emergency, or mobile basis.

The system with the appliance enables organizations, groups, individuals, and other entities to work, provide services, or collaborate in rugged locations, in locations on a temporary basis, or in other locations where a computing infrastructure is damaged, unprotected, inadequate, nonexistent, or otherwise incapable of meeting particular needs. Examples of such organizations include military groups, emergency relief agencies, medical teams, diplomatic and aid organizations, news organizations, dignitaries and delegations of traveling officials, law enforcement and emergency management agencies (such as agencies that respond to disaster areas), and so on. Other entities that may employ the system include organizations involved in ensuring reliable operations of infrastructure, such as health care organizations, organizations involved in energy production and transmission infrastructure, agriculture, banking, and transportation. Further, organizations involved in remote work projects such as oil exploration and extraction, mining, overseas construction, timber harvesting, or scientific exploration may employ aspects of the system.

The system in accordance with an embodiment can be used to create full office communications capabilities in network-starved environments or other environments. In some cases, the system can also provide extended coverage, such as with auto meshing units. An appliance can be used to enable communications, field management, surveillance, and other such capabilities at selected locations, such as prior to the establishment of permanent networking/computing capabilities.

The system is configured to have flexible capabilities that adapt to changing requirements due to, as an example, changing personnel, range expansion, modified operations, or the addition of new components to provide a desired functionality. An appliance can be used to provide capabilities at a plurality of different sites (such as temporary strategic military sites, disaster relief sites, historic sites, etc.) that may include changing personnel.

The system in one embodiment can be used to provide the above capabilities in settings where IT personnel or financial resources restrict near-term implementation of permanent facilities (such as fiber optic connections or high speed distribution networks). Accordingly, the appliance can be used to provide temporary capabilities while resource planning is underway. The system enables organizations to work with a full implementation of communications networks for interim periods, with little loss of productivity and little or no sunk costs. The system can also become an integral part of the facilities upon completion.

In one embodiment, the appliance includes a rugged case or package resistant to many environmental factors (rain, heat, dust, vibration, rough handling, etc.). In some embodiments, the rugged case can have a plurality of sections coupleable together and configured to securely retain and protect the COTS components therein. The case can include an integral rack system configured to receive and securely contain the COTS components. The case can, in another embodiment, include a plurality of removeable trays or drawers on which selected COTS components are mounted. The case can be configured to provide protection for the system at levels above military standards and specifications. The case can also include external housing structures (such as faceplates) that protect the internal components from tampering and provide easy access and identification of ports, jacks, indicators, and other external features.

The case can support a forced air cooling system, such as a high velocity forced air cooling system with custom ducting that enables the COTS components and system to remain cool in extreme conditions. In one embodiment, the tray assemblies in the case can include an air flow control system that directs the flow of cooling air over and/or through components on the drawer assemblies to keep the operating temperatures of the components below selected levels.

As indicated above, a plurality of COTS components are contained within the case. The COTS components can include a conventional server with robust hosting applications, such as an Intel-based Pentium 4 server that hosts applications, file and print services, and that works with many operating systems, such as Windows, Linux, etc. In one embodiment, the server is configured to run a comprehensive software management system that coordinates the operation and maintenance, monitoring and intelligent diagnostics of the system (including integrated remote management capabilities). The management software is discussed in greater detail below. The server is also configurable to run conventional operating system software, component-specific software, and/or other integrated software. In one embodiment, the appliance's server is an Innovations Solutions server that runs a Windows platform (e.g., Windows 2003 from Microsoft Corp.), although other suitable COTS servers can be used.

The server is operatively connected to one or more network switches (e.g., a POE switch) mounted in the appliance to provide local network capabilities for LAN connectivity as well as power for LAN devices. In one embodiment, the network switch is a Foundry 2402 POE switch. The switch is coupled to a firewall or other data security device that provides safe access to external networks. In one embodiment, the appliance utilizes a Juniper NetScreen 5XT or other FIPS 140 approved firewalls, which may include anti-virus filtering, filtering of objectionable content from the web, and intrusion prevention.

The network switch is also connected to a universal power source (UPS) that can be used to control the power flow to all of the COTS components. In one embodiment, the UPS is an MGE 1500 universal power source, although other UPS components can be used. The UPS can be coupled to a self-contained DC power source, such as a battery pack or other power source in the appliance. In another embodiment, the UPS may be coupled to an AC power source to provide power to the COTS components.

The appliance can include a COTS encryption gateway configured with conventional data encryption techniques. In one embodiment, an encryption gateway is provided, such as a FIPS 140 approved encryption gateway that provides military-grade encryption of data prior to transmission over the 802.11 wireless transports. Additional encryption support may be provided with an optional NSA Type-1 encryption that additionally or alternatively supports transmission of classified data over 802.11 (WiFi) wireless communications. In one embodiment, the appliance is provided with an Air Fortress 7500 encryption gateway configured with an AES 256 encryption protocol in accordance with military specifications.

The encryption gateway can be connected to a conventional access point, such as a wireless access/receiver that receives and directs data to and from the encryption gateway. In one embodiment, a wireless access point provided in the appliance is a Foundry IP 200 Access Point, although other access points can be used in other embodiments having an encryption gateway. In yet other embodiments, an encryption gateway may not be needed for the system.

The appliance also includes a fully contained phone system, including a COTS phone hub with jacks or other connectors, and phone software that runs on the server. The phone system includes a Voice over IP (VoIP) system that offers full PBX functionalities, such as Voice Mail, MLPP, and unified messaging. In one embodiment, the phone system includes a Sphere VG3 phone hub that works in conjunction with Spherical telephony software. Other COTS telecommunication services can be provided in the appliance, such as a hardwired 10/100 megabit WAN connection and POTs connections that support PBX and regular phone services. Other embodiments can use other telecommunications systems.

The appliance can also include a data input device, such as a rugged, durable, stowable keyboard coupled to the server. In one embodiment, the keyboard is a Keyboard Video Monitor assembly mounted to the case so as to be moveable between stowed and deployed positions. The keyboard can be installed on a moveable keyboard tray or pivotally connected to a portion of the case so as to allow the keyboard to be deployed or folded away and stowed in a safe location.

The appliance can also include one or more removable data storage devices coupled to the server, such as removable flash drives, hard drives, or disks for convenient removal of data. In some cases, the removable data storage devices are externally facing and are necessary for quick removal of data or other applications (such as during hostile situations), when extra drive capacity is required, for archiving purposes, and so on. The system may employ external USB connections that provide for configuration backup/restore of equipment settings and for quick removal of data. The appliance can also include externally facing removable medium drives (such as a DVD-RW drive) for loading software into the server or other COTS components in the appliance.

The system can also include one or more range extension components coupleable to the appliance to extend the boundary of the broadband communications network. In one embodiment, a plurality of advanced range extension components utilizing 54 Mbps wireless meshing are used to extend the range of the 802.11 wireless transport coverage. In another embodiment, a plurality of appliances can be physically spaced apart from each other and operatively interconnected so as to provide a very broad range of the resulting broadband communications network.

The system in accordance with the present invention provides an extremely flexible integrated system that allows for the combination and integration of a wide range of COTS components within a rugged, mobile, transportable case or cases that can be carried by personnel and easily deployed to provide a mobile broadband communications system having the desired operational capabilities for a particular use or configuration in an edge environment or other location. For example, aspects of the system may employ any number of COTS computers, networks (whether they are the Internet, a WAN, a LAN, wireless networks, cellular networks, 802.11 networks, voice, telephone services, fax, Virtual Private Network (VPN,) or other topologies), networking equipment (such as routers, switches, caches, modems, cable modems, firewalls, wireless access points, interface cards, or other networking interface devices) servers (Web, Application, File, Database, Authentication, DNS, and any other type of server), and/or client and server software (Applications, Software Services, Browsers, Plug-ins, Code Libraries, Drivers, and so on) that are configured or otherwise connected such that the individual, or sum of the components, are utilized in any fashion to create a mobile or deployable data and communications appliance that may be used in "edge" environments by technical or non-technical personnel.

Examples of the system will now be described for purposes of illustration. The following description provides specific details for a thorough understanding and enabling description of these examples. One skilled in the art will understand, however, that the system may be practiced without all of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Referring to FIG. 1, a block diagram of the integrated broadband communications system 100 in accordance with at least one embodiment is shown at a communications center 102, such as a command center, a base camp, or other selected location. The illustrated system includes an appliance 110 coupleable to a satellite communications module 120 (or other communications modules not shown) and to remote units 130 that extend the range of communications to and from the appliance. The appliance provides voice and/or data communications from the communications center to other locations (not shown) via the module 120 or other wireless or wired data/voice communications devices. The system may be used to provide communications between areas within a communications area defined by the appliance and any remote units. For example, observation posts 140 and perimeter security posts 150 may utilize the appliance when communicating to sites in the camp or to sites off location. Additional sites or additional appliances (not shown) may also communicate with the central appliance. These additional sites or appliances may communicate with the central appliance via the remote units 130, or may employ free space optics or other communication techniques, such as longer range communication techniques.

Figure 2:
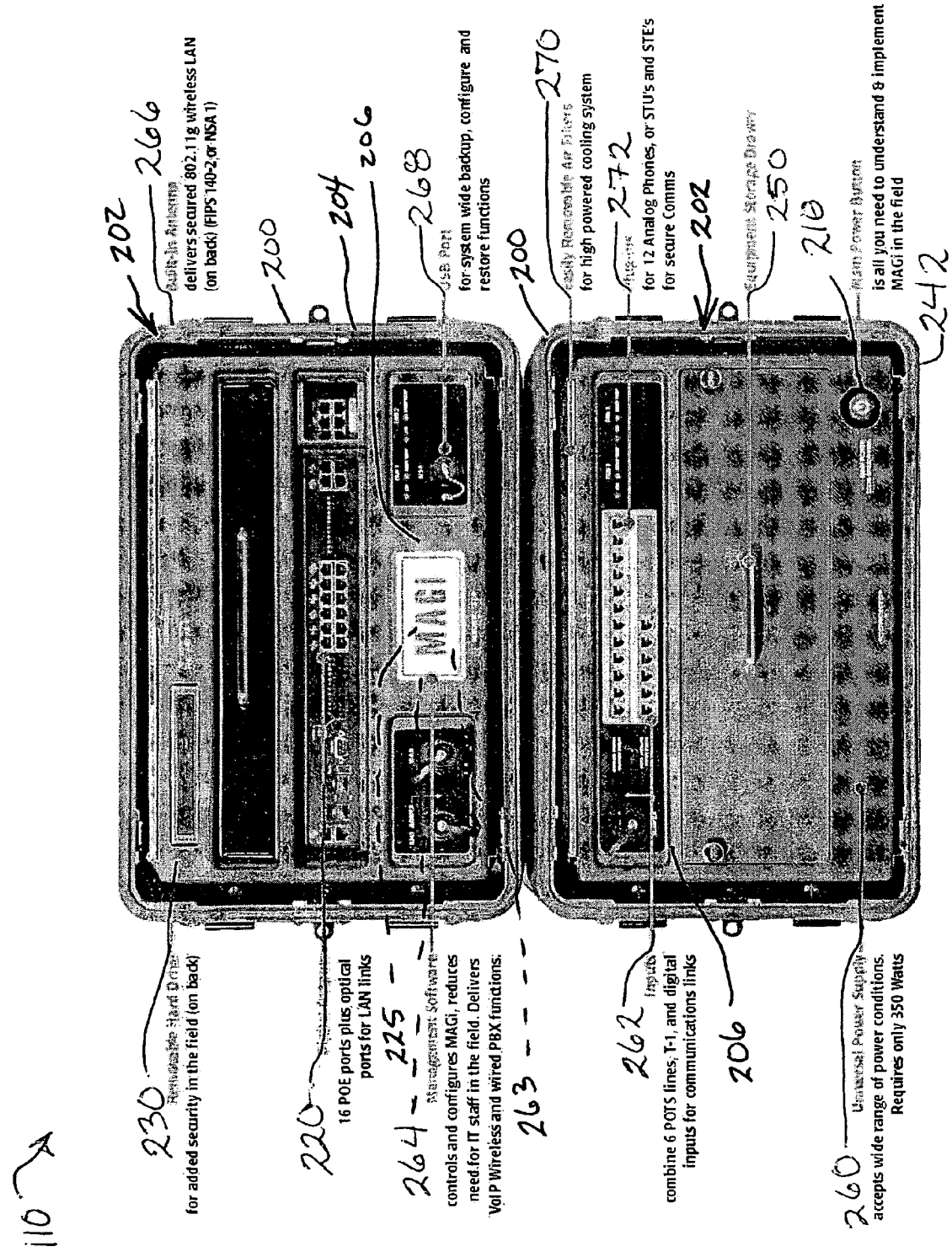
FIG. 2 illustrates a front, exterior view of an example appliance.

FIG. 2 is a front, exterior view of an appliance 110 in accordance with at least one embodiment. The illustrated appliance includes a pair of rugged cases 200 that contain a plurality of COTS components 202 mounted in a compact manner within the cases. The cases 200 form enclosures around the COTS components 202 that shield and protect the COTS components. Each case is configured to be carried by personnel. In one embodiment, the case is designed to be carried by two people. In another embodiment, the case is designed to be carried by one person. Accordingly, the appliance is mobile and can be deployed with a minimal amount of man-power. Each case includes an open front side 204 that allows access to at least the front sides of the COTS components. In one embodiment, a cover (not shown) can be attached to the open front side of the case to fully enclose all of the COTS components so as to provide protection for the components, such as when the appliance is not in use, is in transport, or is in the process of being deployed.

The appliance may include face plates 206 adjacent to the open front side and attached to the COTS components to protect the equipment from damage. The faceplates can have openings designed to expose user-serviceable items on the COTS components inside the case. The face plates can also be configured to cover portions of the components that are not intended to be user-serviceable items, such as reserved ports and selected switches, fuses, selected circuitry, or other features that should not be adjusted upon deployment of the appliance.

In this example, the appliance 110 provides an integrated power button 210 coupled to the COTS components 202 and configured so that when the power button is activated, all of the COTS components receive power and automatically boot up in a selected sequence (as controlled by the server) to create the active broadband communication system. Accordingly, the appliance is configured such that the entire mobile broadband communication system can be activated by pressing a single power button. In the illustrated embodiment, the COTS components are configured so as to power up and boot up to provide the IT services in a matter of a few minutes, including services such as dial tone, WAN, LAN, WLAN, File/Print services, management services, and other selected services.

The appliance 110 of the illustrated embodiment includes the single power button 210 in a location so as to be exposed to the outside of the case for easy access. The power button 210 in other embodiments may be attached to the case, to an internal structure of the case, on special brackets, directly to the IT equipment, or in other configurations. The illustrated embodiment utilizes a power button, although other embodiments can use other on/off switches are mechanisms to activate and deactivate the appliance.

The illustrated appliance 110 has a plurality of input and/or output ports 220 (such as ports provided on the COTS components 202) that allow peripheral devices to quickly and easily connect to a selected COTS component in the appliance. For example, the input/output ports could be used to connect computers (e.g., laptop computers), phones, LAN/WAN connections, USB devices, and other peripheral devices. The ports may be externally located and may include communications ports, such as WAN, USB and Serial connections that connect to the COTS IT equipment via internal circuits or wiring provided by the system. These connections provide for easily and quickly establishing the communication with the internal IT devices, thereby allowing the appliance to reinforce the components and house them in a secure and protective manner.

The illustrated appliance 110 has a COTS server 225, such as the server discussed above, supported in the case and operatively coupleable to a removable hard drive 230. The removable hard drive 230 may comprise a USB-connected removable hard drive, which may be encased in a custom designed plastic clam-shell "docking bay." The bay may hold the USB connector and may provide for reliable registration of the USB drive to a USB connector that communicates with an internal server. The removable hard drive can be plugged into the appliance, and data, files, software, or other information can be saved from the server or uploaded onto the server.

In the illustrated embodiment, each case 200 of the appliance 110 contains different COTS components that work together to provide the mobile broadband communications system. The COTS components in the two cases are operatively coupled together by power and data cables that interconnect the cases and their respective COTS components. In the illustrated embodiment, each of the two cases are shaped and sized to allow one or two people to be able to carry, transport, and deploy each case during transportation or deployment. Each case can be configured with handles to increase the ease with which the cases and their COTS components can be moved by personnel. In other embodiments, all of the COTS components can be contained in a single case that can be readily transported and moved for deployment in a selected location.

The appliance 110 in the illustrated embodiment includes a storage area 250, such as a drawer, shelf, or other type of storage area. This storage area may house operator's guides and manuals, tools, accessories, equipment, or other items. In some configurations of the appliance and its COTS components, the system includes operation manuals, including custom-developed manuals that provide instructions for setup, quick start, error handling, configuration, and other operational steps of the system. These documents may also be available "online" via the management software.

The appliance 110 of the illustrated embodiment has a power supply 260 (such as a universal power supply) connected to the single power button 210 and operatively connected to the other COTS components 202. The appliance also has a plurality of communication inputs 262 (such as POTS lines, T-1 lines and other digital communication links) coupled to the network switch (not shown), the phone hub (not shown) or other COTS components. The appliance also include server 263 that runs management software 264 used to control and manage the system, as discussed in greater detail below. The illustrated appliance also has an antenna 266 (such as a built-in antenna) used to provide the wireless network to a surrounding area.

The appliance also includes one or more USB ports 268 coupled to the sever and configured to enable system-wide backup, configuration modification, configuration restoration, and/or other data transfer to a removable data storage medium, such as a flash drive memory stick or other device. The appliance also includes a plurality of jacks 272 or other plug devices coupled to the phone system to allow for easy and fast access to the system for analog phones and other secured communication devices.

Figure 3:
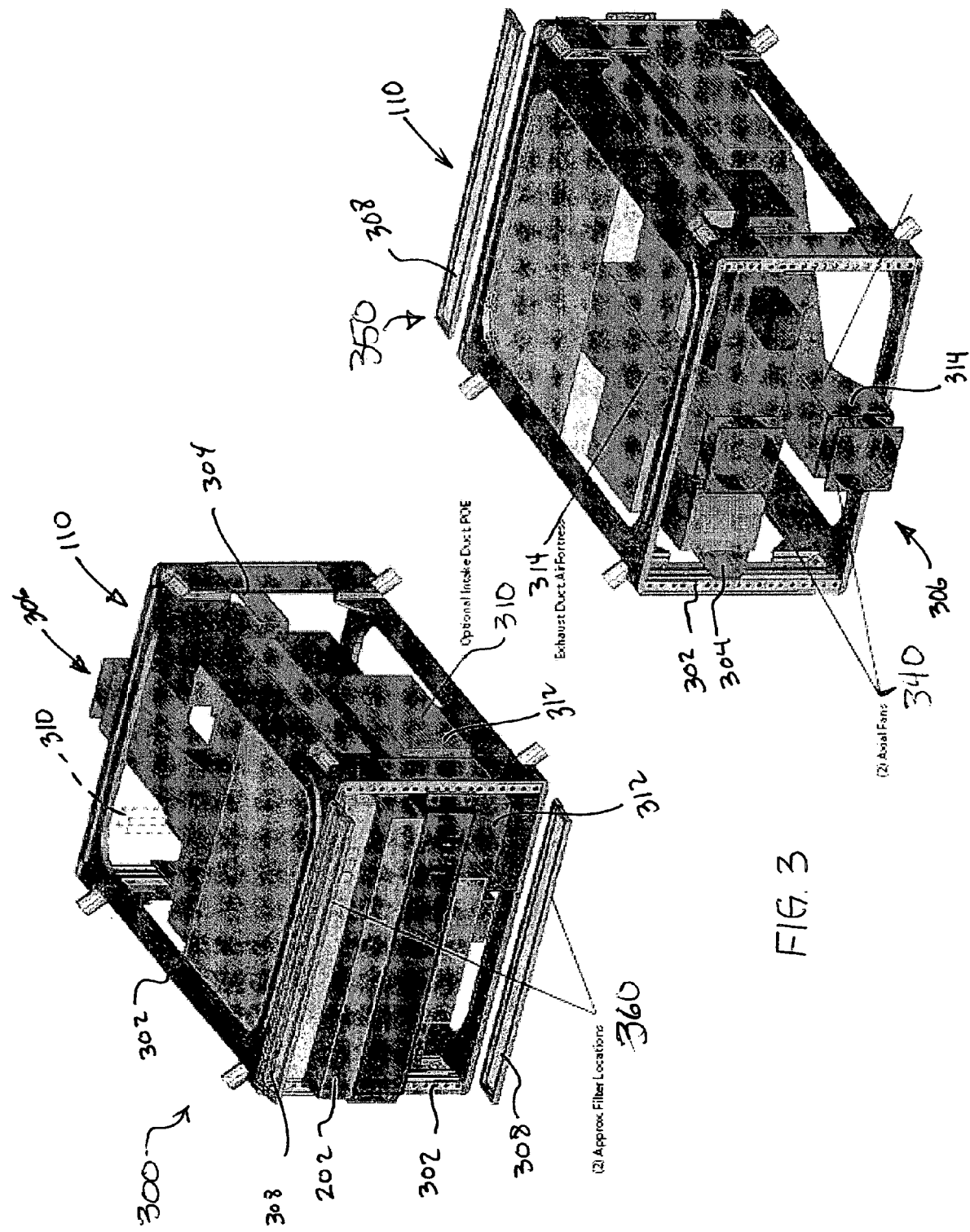
FIG. 3 illustrates an interior of the appliance.
Figure 4:
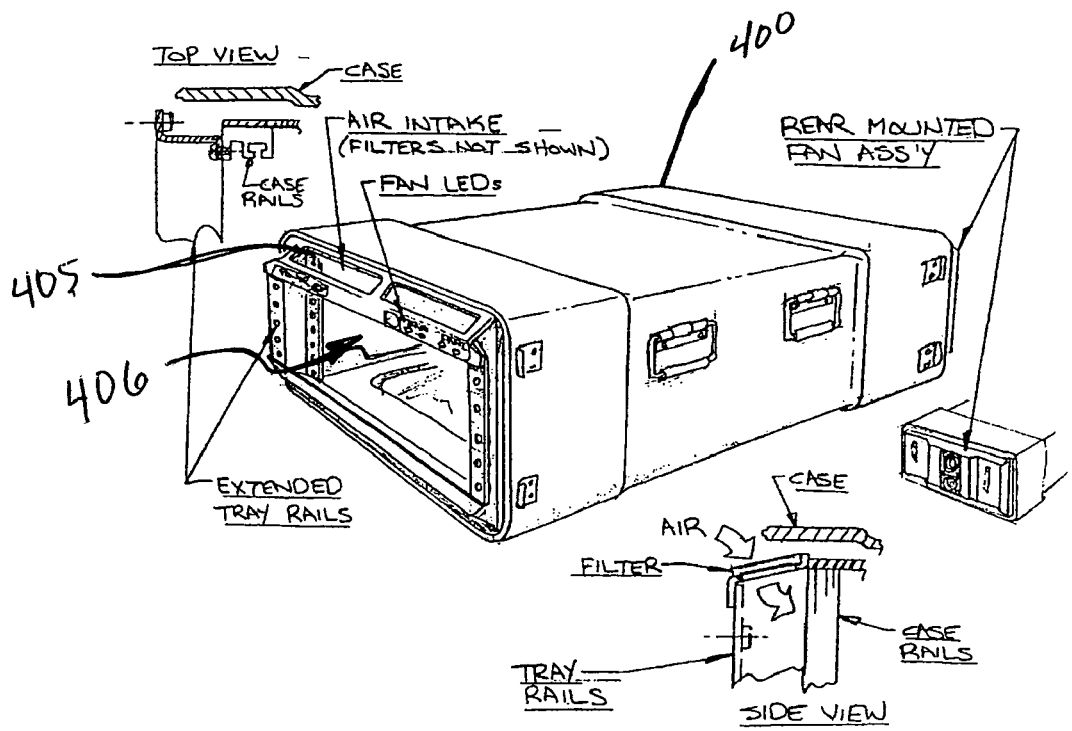
FIG. 4 illustrates a rugged external case for enclosing commercial off-the-shelf ("COTS") components in accordance with one embodiment.
Figure 5A:
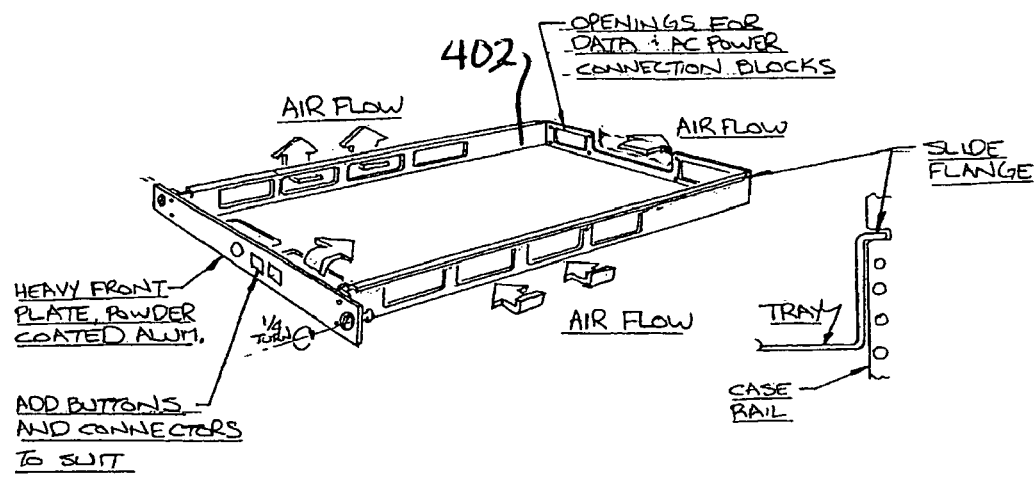
FIGS. 5A-C illustrate features of the rugged external case and a plurality of equipment drawers with the COTS components installed thereon.
Figure 5B:
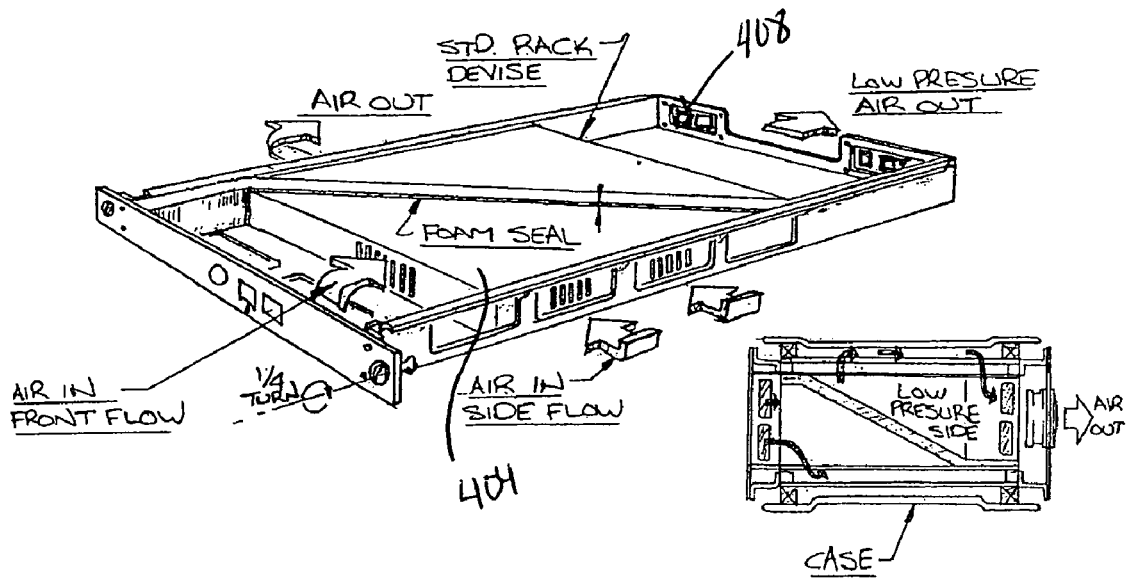
Figure 5C:
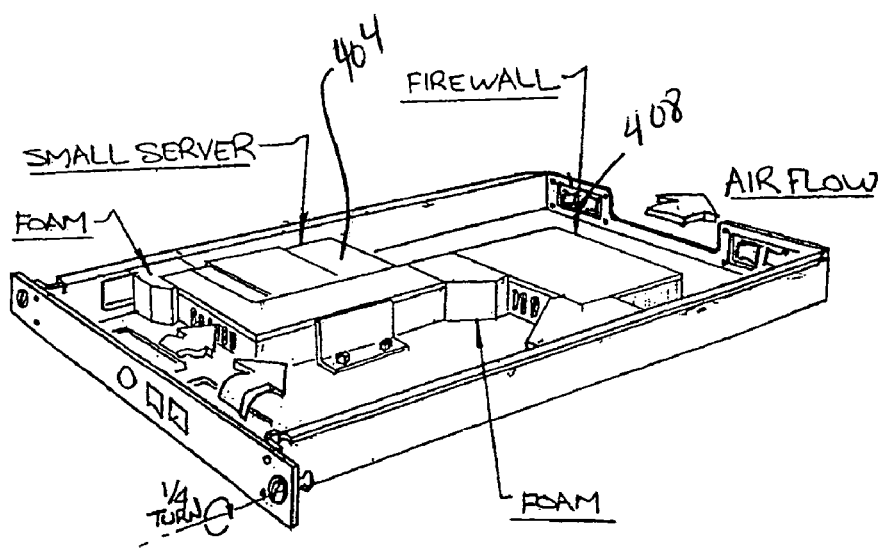

Referring to FIG. 3, a front view 300 and back view 350 of the interior of the appliance 110 is shown. In some examples, the interior of the appliance 110 comprises reinforcing brackets 302, rack components 304 that support the COTS components 202, a cooling system 306, an air filter system 308, and a custom wiring harness 310. The illustrated cooling system is a high-velocity air cooling system that pulls high-velocity air through the air filters, into one or more intake ducts 312, directly through selected COTS components, and out through exhaust ducts 314.

The cooling system 306 of the illustrated embodiment includes high-velocity, variable speed, electronically controlled axial fans 340 connected to the exhaust ducts 314 and positioned to pull the air through the air filter system, through the duct work, and directly into or out of existing air vents in the selected COTS components. The fans 340 are driven by custom electronics coupled to the server and that adjust the fan speed based upon the appliance's internal temperature.

In one embodiment, the air filter system 308 has one or more removable air filters and the inlets are sealably connected to the faceplates of the cases for a controlled air flow path into the ducts to provide for effective cooling and temperature regulation of the internal components. In some embodiments, visual indicators, such as LEDs, on the outside of the case are provided to indicate when fans are turned on or when the internal temperature is above or below what is recommended. The indicators may also monitor other aspects of the internal environment of the system, such as impurities of the air, and the functionality of the filters, ducts, or fans. Further details describing the cooling system may be found in commonly assigned U.S. Provisional patent application Ser. No. 11/435,355, entitled "High Velocity Air Cooling for Electronic Equipment," filed May 16, 2006, referred to above and incorporated herein.

FIGS. 4 and 5A-C illustrate a rugged external case 400 of another embodiment and a plurality of equipment drawers or trays 502 with the COTS components 504 shown installed thereon. In the illustrated embodiment, the rugged case 400 is configured with air intake areas 405 configured to receive air filters and to allow air to flow into the case's interior area 406 and along an air flow path through the trays and through the COTS components. In one embodiment, the trays are removable from the case to allow access to the COTS components. The trays of the illustrated embodiment are drawer-like trays moveable relative to the case between stowed and pulled-out positions. The COTS components and their power and connection cables are securely fixed and non-moveable relative to the trays. When the trays are in the stowed position, the COTS components are securely fixed, enclosed, and protected within the case. When the trays are in the pulled-out position, the COTS components can be exposed to allow access to the COTS components if needed. The trays and COTS components are configured with seals that engage the case or adjacent trays to direct airflow over and/or through the COTS components to cool the components within the case during operation.

The trays 502 are also configured with a plurality of power and data connectors 508 that connect to the COTS components 504 positioned on the tray. The connectors are adapted to mate with compatible connectors on an interface panel within the rugged casing. The interface panel is adapted to connect to each of the trays/connectors, thereby operatively connecting to each of the COTS components when the tray is in the stowed position. When all of the trays are in the stowed position, the COTS components (e.g., the main server, the USB, and other components) are connected to the interface panel, and thereby allowed to communicate between each other for operation of the entire system. The interface panel of one case 400 is also operatively connectable to the interface panel of another case so as to operatively join the COTS components together in each of the rugged casings.

In one embodiment, each tray 502 with the COTS components 504 thereon are configured with a uniform size and shape, so a drawer and its COTS components can be unplugged from the interface panel, removed from the case as a unit, and replaced with another tray with similar or different COTS components. This replacement drawer and its COTS components are automatically integrated into the system upon plugging into the interface panel, so as to be able to receive power and to communicate with the other COTS components within the system. Accordingly, this configuration allows for fast and easy component replacement or removal in a plug-and-play type configuration.

Figure 6:
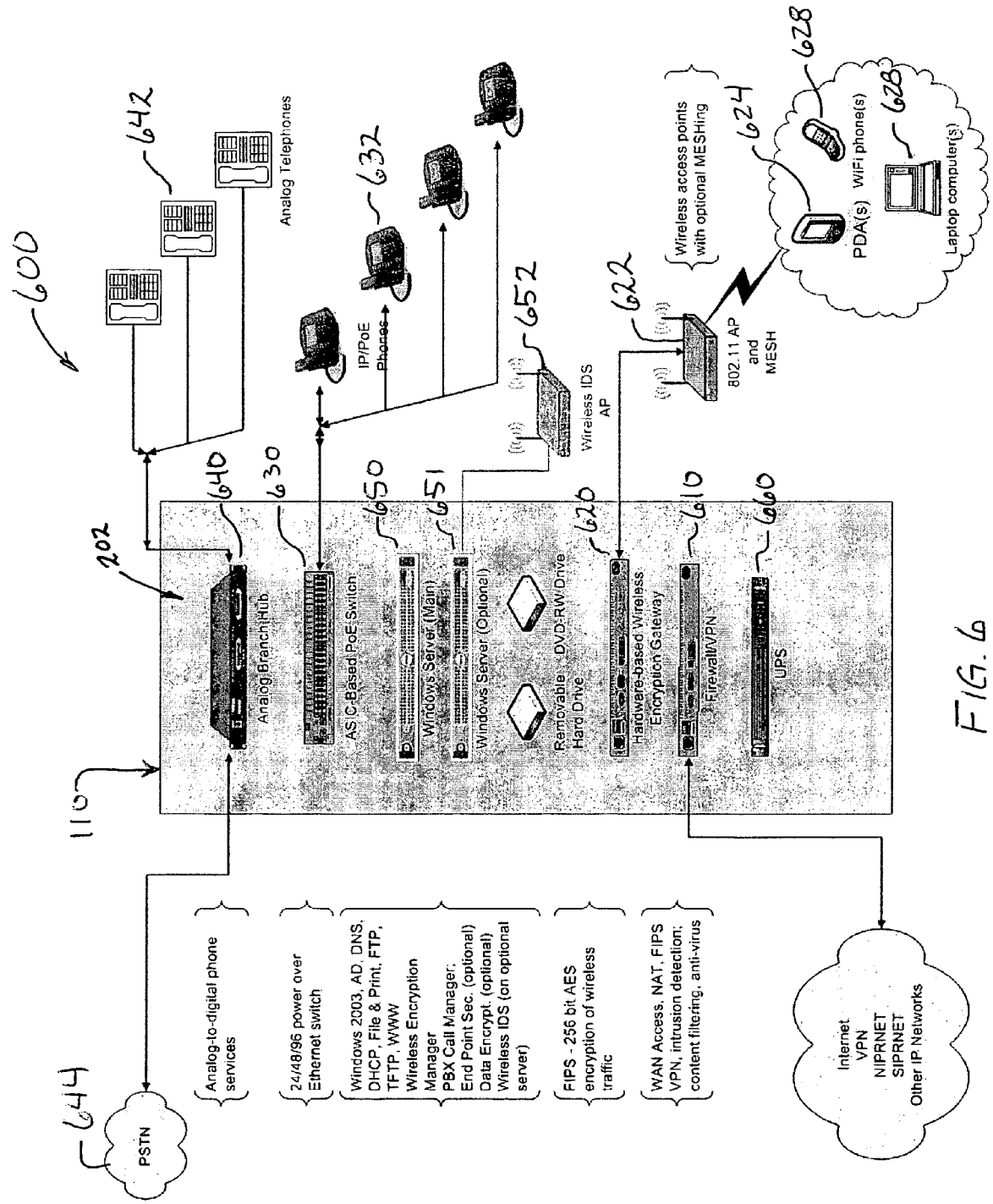
FIG. 6 is a block diagram illustrating internal COTS components supported and housed by the system to provide IT and communications services.

Referring to FIG. 6, an example of internal COTS equipment supported and housed by the appliance 110 to provide IT services is shown as diagram 600. The appliance 110 may contain some or all of the COTS components 202 shown in the figure. For example, the appliance may contain a firewall 610 that provides anti-virus security, content filtering, VPN, NAT, IPS, or other security and protective capabilities. Also, the appliance may contain a wireless encryption gateway 620 that provides encryption for wireless communications via a wireless access point (AP) 622, MESH components, or other wireless communications modules. The gateway 620 may use AES or other encryption techniques. Access points may be FIPS 140-2 certified 802.11x (such as 802.11b, 802.11g, and so on) access points, may be 802.11 x meshing base stations, may be NSA Type-1 classified 802.11 x access points, and so on. Any or all of the access points may provide communications to and from personal digital assistants 624, mobile phones 626, laptops 628, and other wireless-enabled devices. Furthermore, there may be a network switch 630 that provides communications for IP/PoE phones 632 or other telecommunications devices. Also, the appliance may include an analog branch hub 640 that provides communications for analog telephones 642 and other analog communication devices to PSTN networks.

The appliance also comprises a server 650 (plus an optional backup or additional server 651 that may also be connected to an access point, such as an IDS AP 652). The server 650 may be a Pentium 4 server, running the windows operating system. The server 650 may control and store some or all aspects of the operations of the appliance and the operations of each of the components. For example, the server may contain VoIP call manager and administration software, anti-virus software, system management software (further discussed herein), management software used in encryption gateway authentication, an active directory for authentication, domain controllers, and services such as TFTP, DNS, DHCP, WWW, FTP, email, or other services. The appliance 110 may also contain a display device (such as an LCD-based foldout monitor terminal) or related inputs, permanent and removable hard drives, other removable drives (DVD R/W, USB, firewire, and so on), and a UPS battery back-up and power conditioner 660.

The system implements the above COTS components 202 in a configuration that optimizes the performance of the appliance 110. For example, a combination of quality of service settings on the switch, firewall filtering settings, and encryption gateway settings with a software-based call manager enables the system to provide high-quality IT services in edge environments with a large number of users and a minimal setup time.

The system also provides security against hackers, intrusion, spyware, viruses and other electronic attacks through a rigorous security assurance method. For example, the security methods include updating software, firmware, and patches to current and secure versions, turning on patch updating for individual devices via a central patching service, disabling unneeded services and capabilities, disabling unneeded ports and communications interfaces, removing unnecessary or unused software. In some cases, the system performs such operations via automated scripts or manual steps. The security methods also employ numerous security analysis tools, such as COTS security analyzers, third party protocol analyzers, externally executed "attack" simulation tools, web-based analysis tools and other tools that ensure that the system is resistant to known attacks, and that well-known or discovered vulnerability issues are eliminated.

Figure 7:
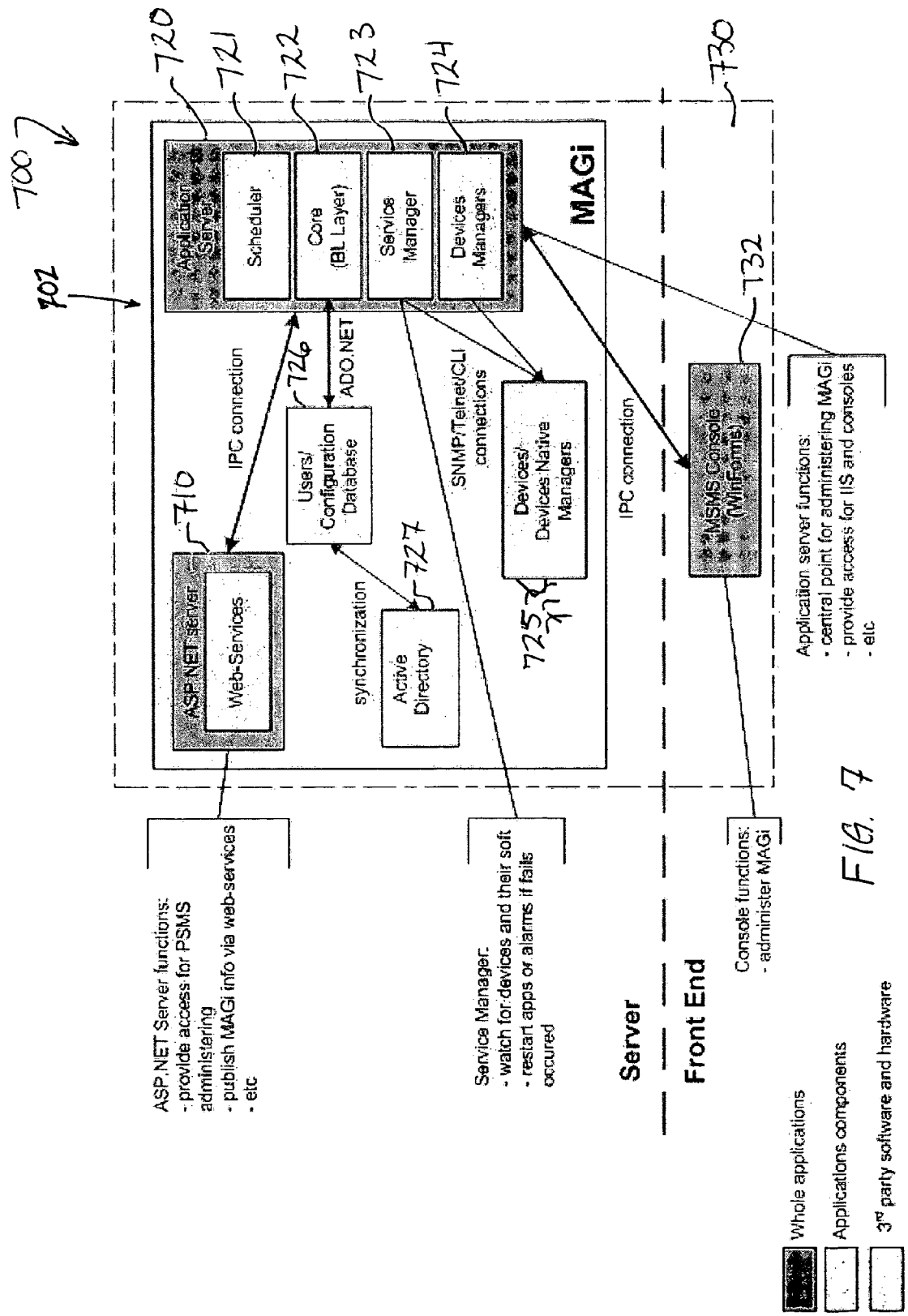
FIG. 7 is a block diagram illustrating the software architecture of the management software employed by the system.

Referring to FIG. 7, a block diagram illustrating the software architecture 700 of the management software 702 employed by the system is shown. The management software is constructed in a modular basis so that each major function can be enhanced without adversely impacting other functions. Functional areas of the management software include abstraction of component interfaces, allowing the invention to control multiple types of components through a variety of protocols, including but not limited to SNMP, TelNet, CLI, Web Services, and HTTP and HTTPS. The management software can include a Web Services module that allows the functions of the invention to be made available to other programs, locally or remotely. The primary purpose of this is to enable administrators to manage the appliance remotely.

Components of the architecture 700 include a remote management module via Web Services 710. The module 710 allows the functions of the management software to be made available to other programs, locally or remotely. For example, module 710 enables administrators to manage the system from remote locations.

Additionally, the architecture 700 comprises an abstraction or application layer 720 that comprises device control managers 724 that control devices via device native managers 725; service managers 723 that monitor the health of the system and its components, including monitoring the health of the MSMS software system; business logic managers 722 (such as a core module) that interact with user and configuration databases 726, such as active directory 727; a scheduler manager 721 that manages timed services; and several other modules. The application layer also interacts with a user interface layer via WinForms 732 or other interfaces.

In the illustrated embodiment, the management software 702 is configured to control the operation and functions of the COTS components 202. For example, the management software is configured to coordinate power cycling of the UPS and the COTS components to ensure reliability of data. The management software also centralizes management functions for some or all of the COTS components, thereby allowing for coordinated device configuration management and configuration through a single point. These management functions can include adding/editing/removing users and devices, setting preferences (date, time, log handling, scheduling), allocating (and reallocating) resources and bandwidth to users, setting group policies, managing the phone systems, and establishing or controlling other operational parameters.

The management software 702 of the illustrated embodiment is configured to update the software and firmware of some or all COTS components 202 in the appliance from a remote server, a CD-ROM, or other input source. Firmware updates normally require custom support for each component. The management software centralizes and coordinates these functions.

The management software 702 can also include support for a complete suite of remote management functions including remote diagnostics and troubleshooting, remote configuration, backup services, and so on. Remote management may be performed by software running on computers that communicate with the system via any supported network infrastructure.

The management software 702 is configured to provide support for a complete suite of management functions, enabling the system to manage remotely deployed "extension" devices that increase the range of the wireless broadband communications network and/or extend the IT and communications services supported by the system into other geographic areas, through the deployment of the remote wired or wireless access points described above. The management software is also able to create 1-to-1, 1-to-many, and many-to-many relationships with various aspects of the system, creating a network of networks.

The management software 702 provides the ability to back up and restore configuration changes within the system, such as by storing these settings on encrypted USB thumb drives or other removable data storage media. In one embodiment, the COTS components 202 each have software provided by its manufacturer to control the operating configuration of that component. The software for the COTS component can include a configuration file that includes all of the operational configuration data for that component. Other COTS components have operational configuration data in multiple files or multiple locations within the component's software. The management software is configured to interface with the software of each COTS component and automatically configures all the COTS components' software for operation with the entire system. Accordingly, the management software assists in configuring the data, timing and operational parameters that allow the COTS components to work together.

The management software 702 is also configured to allow external configuration data (e.g., personnel identification data, location information, system identification information, email addresses, phone numbers, domain identifiers, task identifiers, and other task, location and/or personnel-related communication information or data) to be provided to the COTS components 202 for use during operation of the system. For example, if the system is deployed for use by 100 users at a remote location, the communications-related data for each of the users can be uploaded or otherwise added to the configuration software, and the COTS components will automatically be configured for use related to those users and their communications data.

The appliance 110 includes an integrated external thumbdrive or other drive device removeably coupled to the server, such as at a USB port or other port. The system configuration data from all of the COTS components, including the server, can be downloaded as a system configuration file and stored on the external thumbdrive. If or when needed, the system's configuration and associated data can be saved (e.g., backed up) to the thumbdrive. The integrated thumbdrive can receive a removable data storage device, such as a USB flash memory stick or other data storage means, onto which the configuration data for the system can be saved, removed, and stored in a safe location. If the system's operational configuration changes, intentionally or unintentionally, the operational configuration can be restored by downloading the configuration data via the external thumbdrive.

In another embodiment, the configuration data from one system can be saved via the external thumbdrive onto a USB flash memory stick. The USB flash memory stick can then be plugged into the external thumbdrive of another system and the configuration data downloaded onto that system's server. The server of the second system can then automatically configure the entire system based upon that configuration data, so the second appliance creates an instant wired and wireless network identical to the configuration from the first appliance.

The management software system 702 of the illustrated embodiment is configured to automatically monitor the health and status of the COTS components and the interface therebetween. In one embodiment, the appliance includes monitoring software on the server that regularly monitors the COTS components operational status and can send alerts/alarms to users (such as non-technical users) letting them know about hardware problems, hack attempts, service-level problems (such as dropped calls, bandwidth problems at the backchannel, and so on). Alarm types and routing may be determined at the factory/depot and placed in a configuration file so as to allow for a variety of options such as pager alerts, email alerts, text message alerts, and so on. In some cases, the alerts are received from software interfaces and protocols in the COTS equipment and are filtered, interpreted, and possibly modified by the management software using a number of "expert rules" or policies before being sent to users or forwarded to a remote management system.

The management software is also configured to perform setup automation tasks, such as component and accessory discovery, connection re-establishment and auto-configuration. This may include running automated setup routines to discover and set up phone dialing options, phone trunking configurations (via analog or digital lines, including T1-voice), wireless channel settings, bandwidth allocation on backhaul links, and so on.

In one embodiment, the management software 702 is configured to automatically discover and configure the phone system for connection to any local phone telecommunications systems or private branch exchange (PBX) residing in a company or other organization to allow for voice or data transmission via the local phone lines. Local telecommunications systems around the world, however, have different dialing plans or protocols that a user must use in order to get access to the system (i.e., to get a dial tone). The system includes ports that can receive phone lines from a local phone system or PBX in the area where the appliance is deployed. The management software includes a program that interfaces with the system's phone services and the external phone line to automatically determine the dialing protocol for the local area. Accordingly, a user can simply plug in or otherwise activate a phone via the system, activate the dialing/trunking program, and obtain a dial tone through the local phone line.

In one embodiment, the server controls the system's phone services, causing the phone services to dial a variety of phone numbers using a variety of phone prefixes (8, 9, 1, and area codes, etc.) until a dial tone is successfully established and calls are successfully completed for local, long distance, and PBX (internal) phone calls. Once the phone calls are successfully established, the dial plan is configured in the phone services and is used for subsequent phone calls.

In another embodiment, the server controls the system's phone services, causing the phone services to dial a variety of phone numbers using a variety of settings (such as number of channels, encapsulation types like B8ZS) on a T1 or E1 digital phone connection until a dial tone is successfully established and calls are successfully completed for local, long distance, and PBX (internal) phone calls. Once the phone calls are successfully established, the dial plan and T1/E1 settings are configured in the phone services and are used for subsequent phone calls.

The management software 702 has a data reporting system that includes management status screens on a summary basis, including easy-to-understand visual and/or audible indicators. These indicators may include a management "dashboard" mode (such as with easy-to-spot "red/yellow/green" indicators for device and system functioning, as shown in the figures below). In other embodiments, the indicators can be one or more audible tones that provide an indication to a user regarding the status of the system. The audible indicators can be used with or without the visual indicators.

Figure 8A:
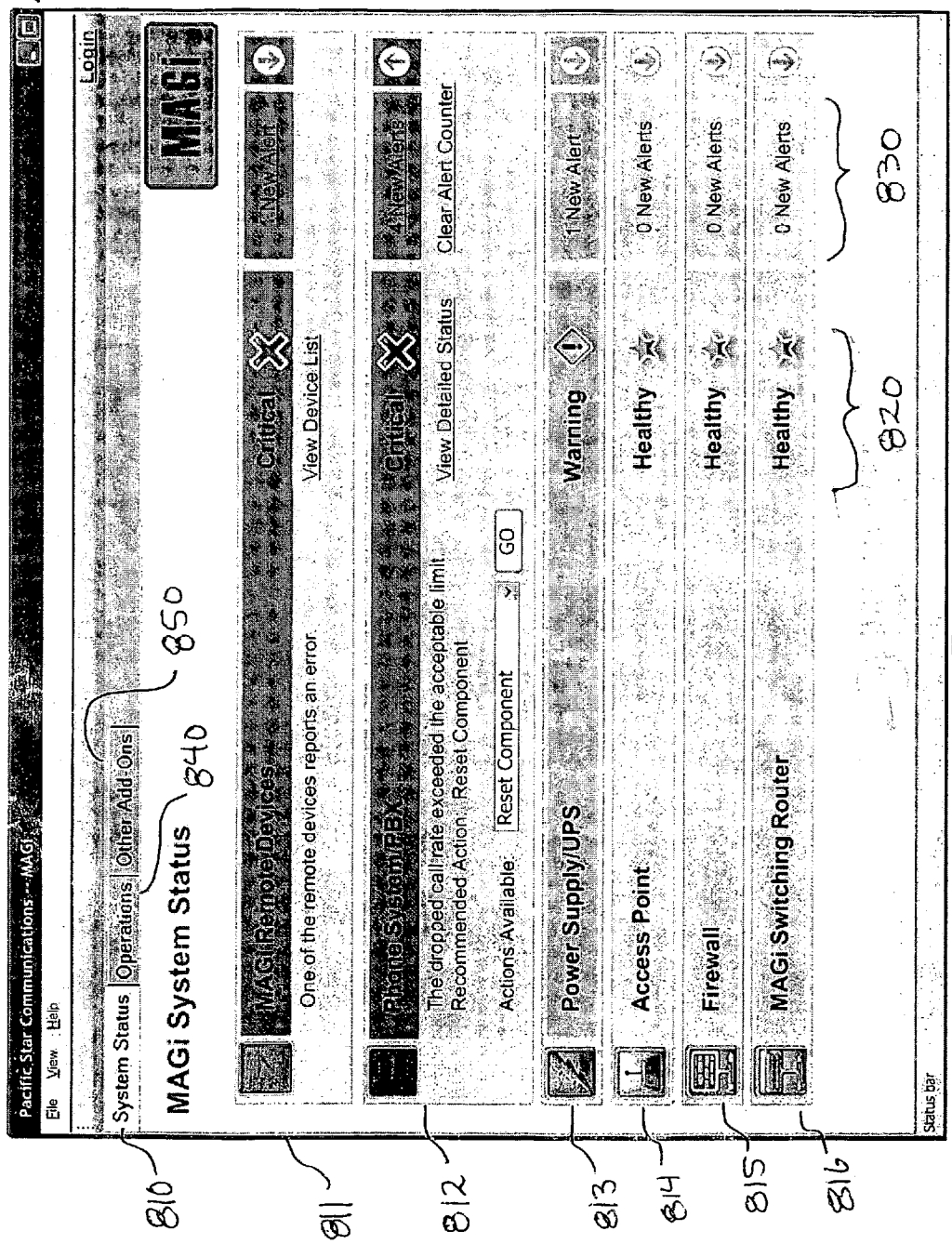
FIGS. 8A-8D are representative computer displays or web pages illustrating management functions of the management software.

FIGS. 8A-8D are representative computer displays or web pages illustrating management functions of the management software. FIG. 8A illustrates a main status screen 800 for the management software. The system configures the management user interface so it is simple to understand and use. The displays provide control features and component indicators to configure each of the devices of the system. For example, the display may provide access to the settings for the devices needed by "in the field" users. In some cases, the displays provide a consistent look and feel from screen to screen.

The main status screen 800 may include a system status panel 810 that displays the status of some or all components of the system. For example, the system status panel 810 of FIG. 8A shows the status of remote devices 811, the phone system 812, the power supply 813, access points 814, the firewall 815, and the switching router 816. Furthermore, the status panel 810 may indicate the state of the components via indicators 820 (such as "critical," "warning," "healthy," and so on), alerts 830, or other displayed signals. In at least one embodiment, the main screen 800 may include a plurality of panels, such as operations panels 840 or other panels 850 that provide information to the user about the status of the system and configuration options for changing the configuration settings. In one embodiment, the software is configured so a user must have administration authorization in order to change the configuration settings.

The management software 702 in the illustrated embodiment includes step-by-step "Wizard" interfaces to guide non-technical users through common administrative tasks, such as adding/removing users and phones, setting system configuration, performing backups, performing diagnostics, optimizations and repairs, and other setup or management functions. The "Wizard" system provides a cohesive approach to configuring multiple COTS IT components, hiding the complexity of system components from the user. Details of the "Wizard" system are included in co-pending U.S. Provisional Patent Application No. 60/775,300, referred to above and incorporated herein.

The functionality aspects of the system in one embodiment centers on the use of the management software 702, which includes "Wizards" to control and automate the configuration of the appliance as a whole—by hiding the complexity that would otherwise be exposed to users of the appliance in the form of numerous configuration/management screens unique to each internal COTS component. The Wizard functionality in an embodiment can include a component configuration management portion that provides the ability to set device configuration of the IP addresses and administrative user names and passwords through a Wizard. A peering function provides the ability to create "peer" relationships between one or multiple systems through a wizard. It creates 1-to-1, 1-to-many, and many-to-many relationships with other instances of the system, creating a network of networks. This is accomplished through the use of establishing multiple VPN tunnels between systems, along with resetting the IP addresses of each system (and its internal components) to ensure that the IP addresses of the internal components do not conflict. The Wizard functionality can be configured to communicate with the Phone System/PBX on each appliance to establish "peer" relationships between those systems, enabling phone systems to call each other with minimal prefix dialing.

Figure 8B:
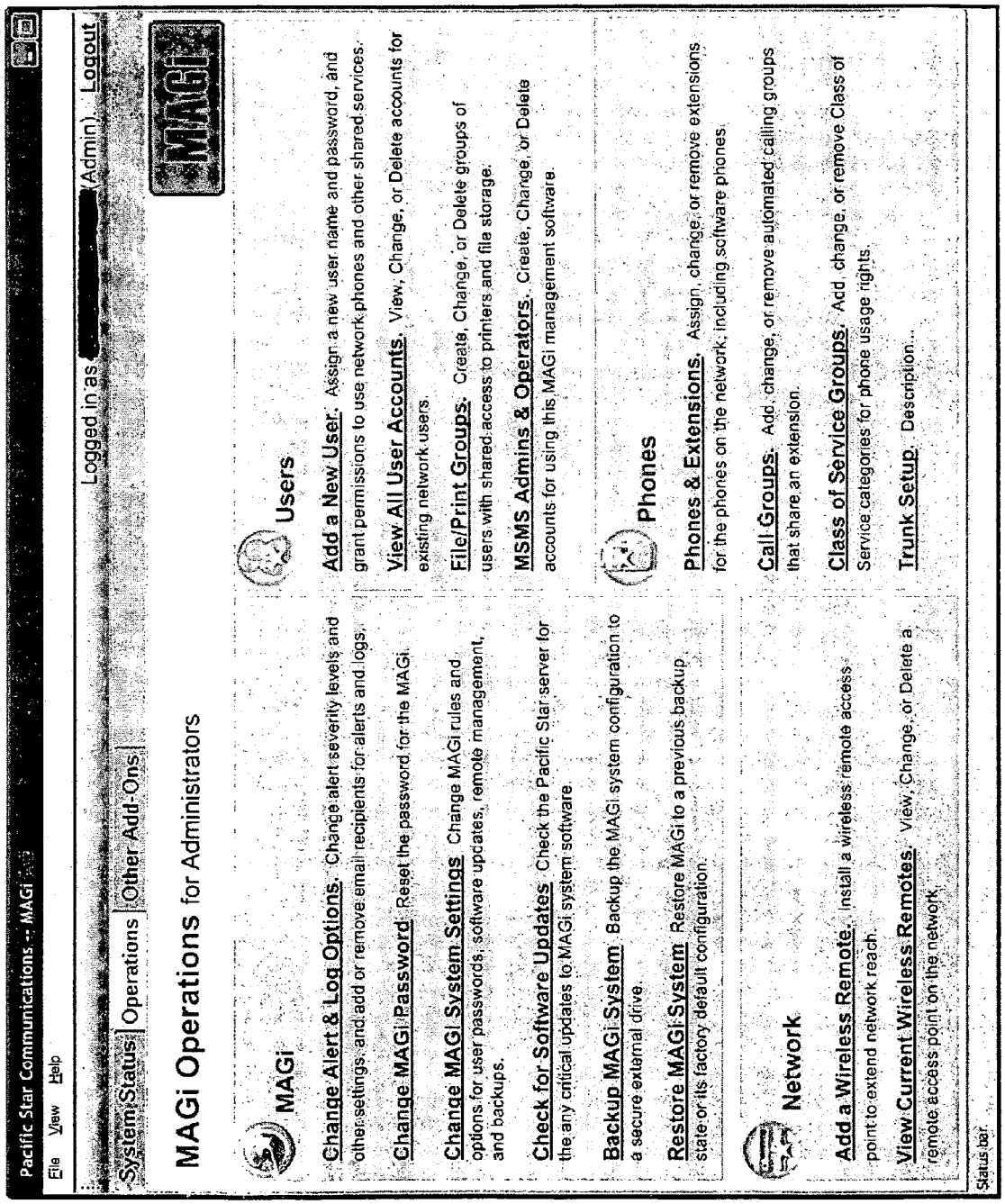
Figure 8C:
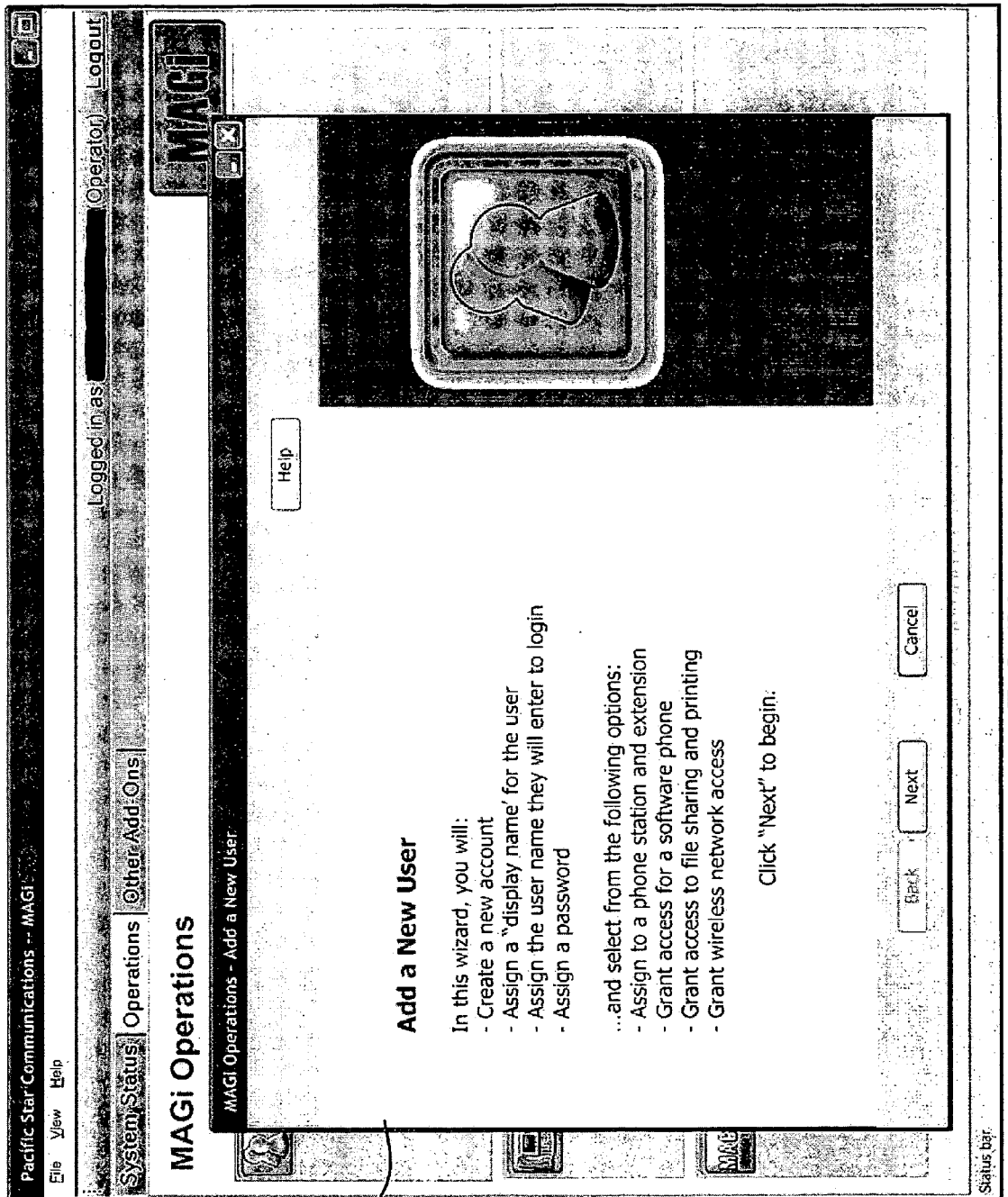
Figure 8D:
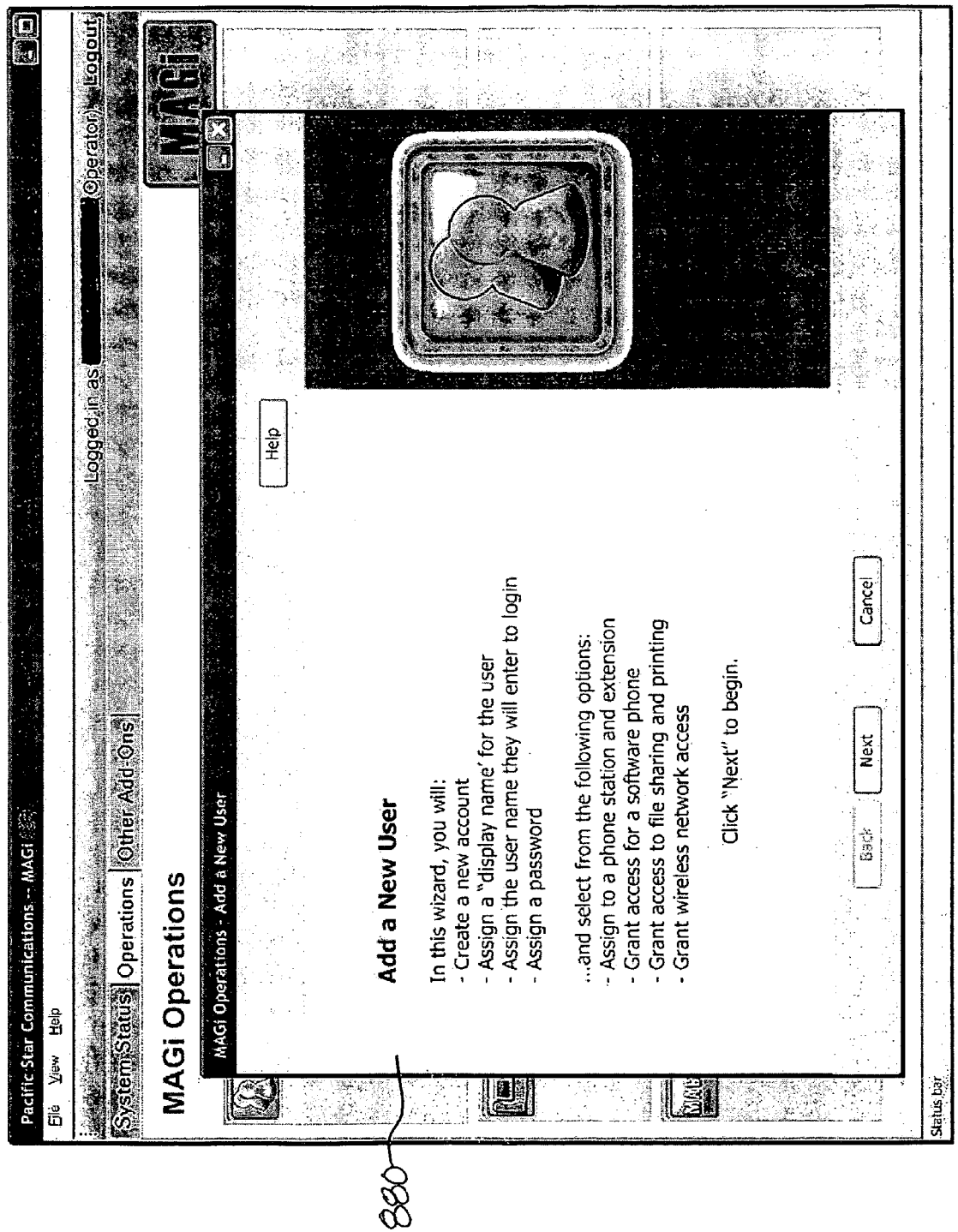

FIG. 8B illustrates a "Menu" screen 860 containing links to execute a variety of wizards. FIG. 8C illustrates a first screen 870 of a Wizard, introducing a non-technical user to the steps needed to add a new user to the system. FIG. 8D illustrates a Wizard screen 880 that prompts users to enter information into the system. In this example, the Wizard assists a user in adding a user name and login name in order to provide a new user access to the system.

The system supports a wide variety of accessories that provide additional "edge" IT and communications services. Some of these accessories include video surveillance, security, sensor networks, high-performance application and storage hosting systems, video teleconferencing systems, vehicle control systems, other command, control, intelligence, and reconnaissance systems.

The system supports a variety of voice and data communications systems connecting IT and communications services with a variety of other networks. Networks supported by the system include the Internet, private PBXs, public phone systems (PSTN/POTS), satellite networks, Free Space Optics-based networks, cellular carriers, military wired networks such as NIPRNET/SIPRNET, military wireless networks, Defense Switched Network (DSN), public agency and private emergency networks, and so on.

The system may connect to a variety of services or interconnect system components via such networks. The system may connect to such networks via many different types of data transport channels, such as T1, xDSL, ISDN, Dial-Up, Satellite, Free Space Optics, Microwave, GSM, Hardwired Network connections such as LAN connections, 802.11, WiMax, unlicensed access networks, and so on.

Other services and functions may be employed with the system to provide more robust communications, management, and storage using the COTS components 202. Referring to FIG. 9, a block diagram illustrating an Autonomous Computing Engine (ACE) 900 is shown. ACE may be part of the services managers 723 of the management software 702. In some cases, ACE monitors the system and optimizes the system's functions to maximize VoIP quality and application performance and maximize the number of users able to engage the system. ACE monitors the health and performance of the network, components, and applications, self-corrects and optimizes the system, and provides alerts to users containing clear and easy-to-understand remediation recommendations when ACE needs assistance. ACE may comprise an optimization and troubleshooting engine 910 and a knowledge base/remediation base 920 coupled to server 650. ACE may provide modules that monitor 930 the VoIP voice quality in a VBX branch hub 931, monitor 932 throughput, latency, protocols, and so on of system connections via a PoE switch 933, monitor 934 applications, services, CPU usage, and so on via the server 650, monitor 935 wireless service quality via a wireless gateway 936, or monitor 937 bandwidth and latency of WAN connections.

The ACE system of the illustrated embodiment provides a real-time, goal-seeking, self-optimizing engine using algorithms to manage aspects of the system. The ACE system also performs real-time monitoring of the system to pinpoint trouble areas, using a network-centric "domain-expert" model based on high level application objectives, without merely relying on simple point metrics.

The ACE system can be configured to perform iterative optimization in real time, making adjustments to systems properties, monitoring the results, and making continuous adjustments until the system performs optimally. Optionally, the ACE system can accommodate administrator inputs to tune its performance based on specific application objectives. ACE may accommodate input from administrators regarding priorities and allowable automatic remediation policies.

ACE generates alerts with simple-to-understand remediation instructions and recommendations for issues it cannot resolve itself, including pinpointing areas where total network performance is lacking or inefficient.

In some cases, the ACE engine comprises state-driven components that use multiple Bayesian models (developed in an off-line, supervised learning mode) to analyze system behavior and identify errors or opportunities for real-time optimization. ACE draws upon a knowledge base of diagnostic and remediation procedures that may be updated from time to time as additional procedures are discovered.

Figure 10:
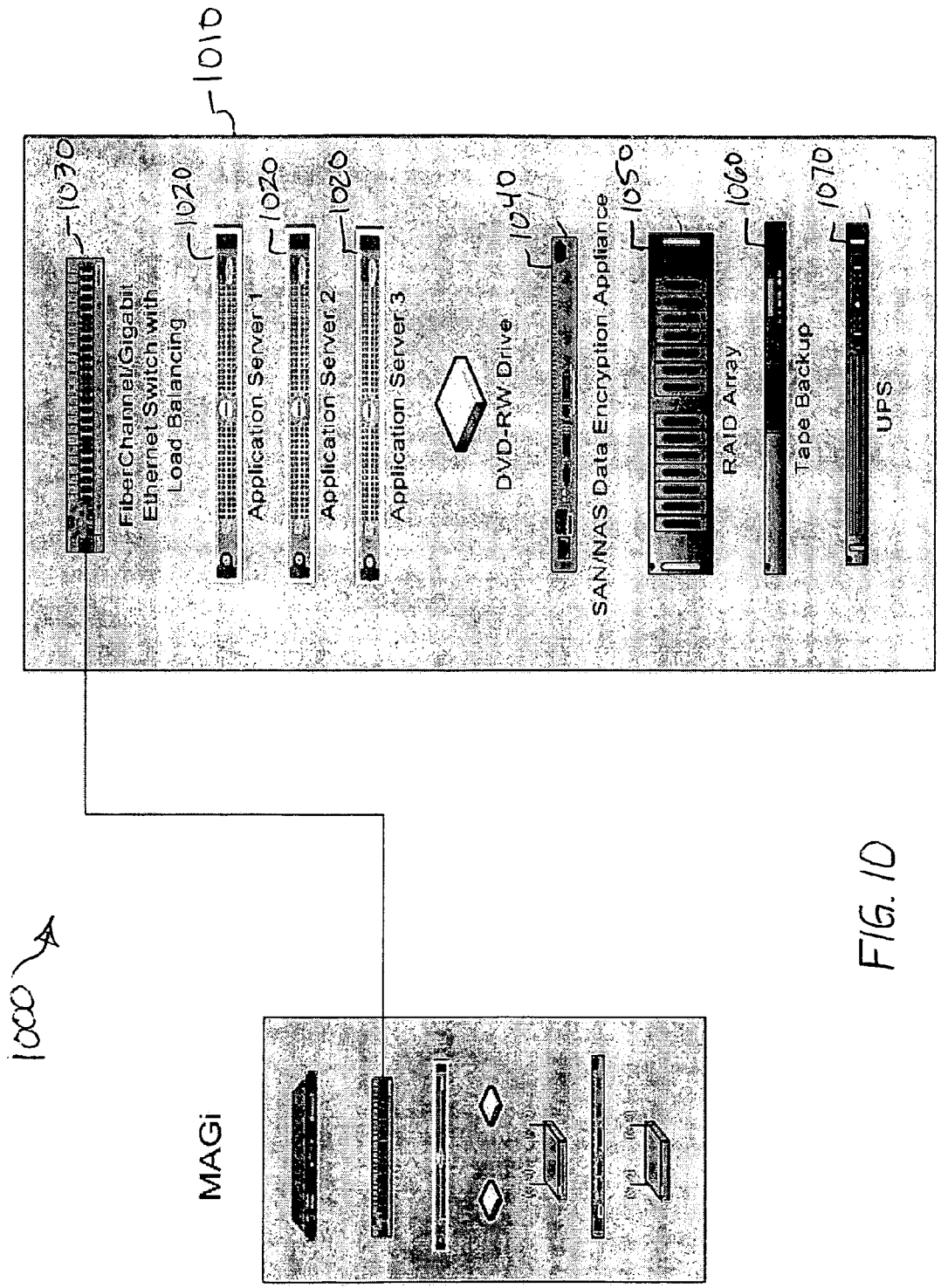
FIG. 10 is a block diagram illustrating an alternative application and storage infrastructure.

Referring to FIG. 10, a block diagram 1000 illustrating an alternative application and storage infrastructure is shown. The application and storage infrastructure 1000 supports additional large data and computationally intensive applications such as email, GIS, GPS, video processing and storage, image storage, edge-based network caching, and so on. Package 1010 is an example of the application and storage infrastructure. Package 1010 contains, for example, one or more application servers 1020, a load balancing switch/router 1030, SAN or NAS architecture network appliances (such as hardware- or software-based storage encryption appliances) 1040, a RAID disk-based storage array 1050, a tape drive 1060 for backup and archiving of data, and/or a power conditioner/UPS/battery backup 1070 component. The package 1010 may also contain system monitors, user displays or user interfaces, management software (such as the MSMS described above), cooling systems, bracketing and support systems, faceplates and other housing components, and so on. Package 1010 may be contained in a rugged case or other described housing types.

The package 1010 of the illustrated embodiment is configured to provide local data storage and application processing at the edge of the network, such as in a poorly connected environment. For example, it may provide local data storage and application processing when back-haul links are down or when data-intensive applications render low-bandwidth links (such as satellite links) ineffective.

The package 1010 can also provide local data storage and application processing that enable distributed "sensor-fusion" applications that filter/process data locally, rather than requiring extensive (and expensive) transmission of data to central data centers. The package also provides application and storage systems that are more accessible for busy, less technical, on-the-field administrators and users.

The package 1010 can also provide integrated application and storage systems, ensuring that best-of-breed third party components work together seamlessly. Data storage and application processing systems can also be integrated with the management and diagnostic software, thereby providing systems that require low IT expertise and maintenance. The package can also provide data storage and application processing systems that are environmentally hardened, thoroughly tested, and secured against attack.

Figure 11:
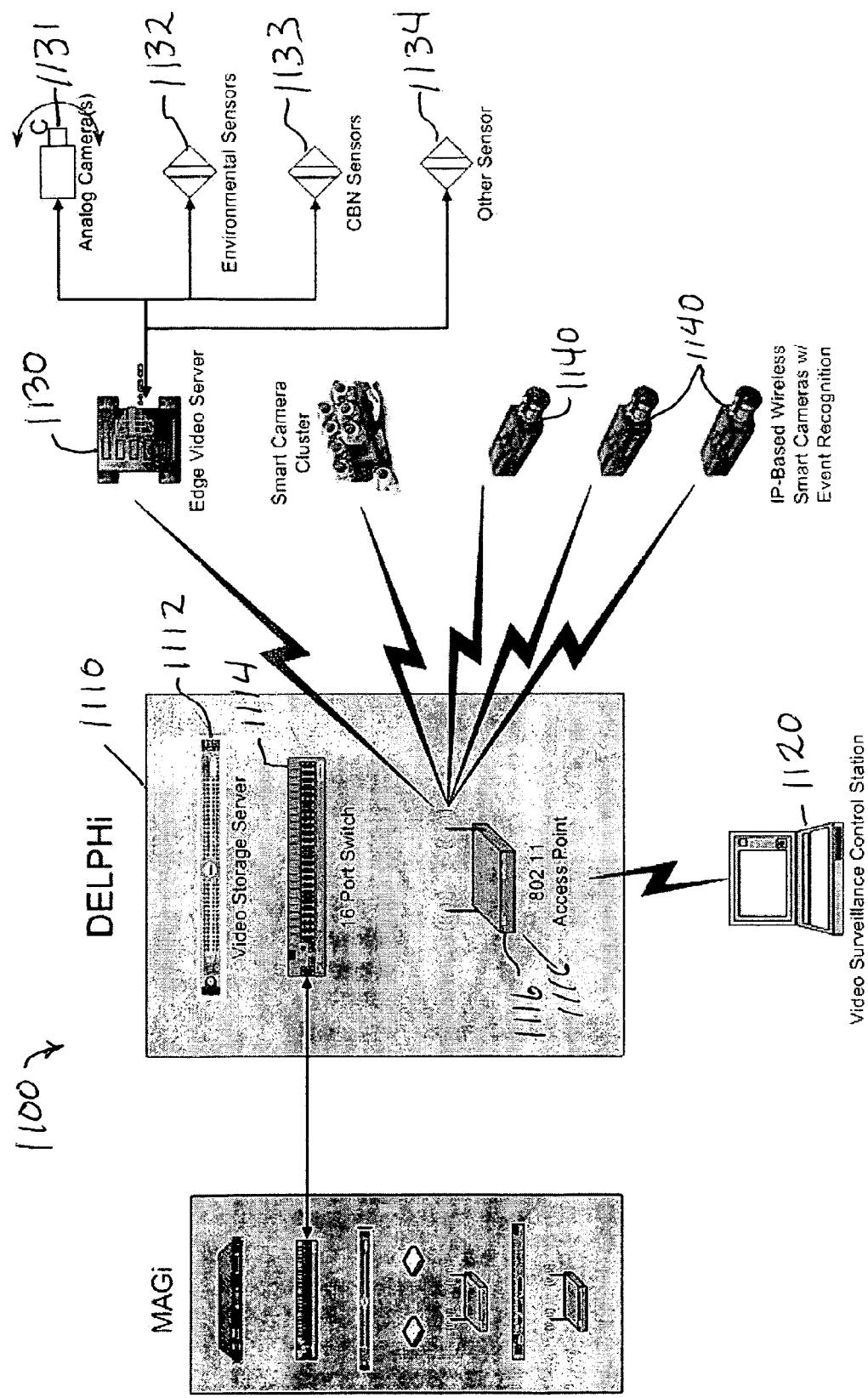
FIG. 11 is a block diagram illustrating a package that provides enhanced IT and communications services in the area of video surveillance and smart sensor networking in "edge" environments.

Referring to FIG. 11, a block diagram 1100 illustrates a package 1110 that provides enhanced IT services in the area of video surveillance and smart sensor networking in "edge" environments. For example, the system may be integrated with accessories that provide distributed, smart sensor and surveillance systems that reduce the amount of required oversight by security personnel. The system may increase the effectiveness of monitoring and surveillance while reducing personnel and other related costs.

The package 1110 may include a video storage server 1112, a switch 1114 (such as a 16 port switch), and an access point 1116. The package may communicate with a video surveillance control station 1120 via the access point. Station 1120 may be a laptop, desktop, Personal Digital Assistant (PDA), or other device capable of communicating with package 1110 and providing displays to a user.

The system uses algorithms running on edge video servers 1130 (connected to analog cameras 1131 and other sensors 1132-1134) and in smart cameras 1140 to detect suspicious events in remote or changing locations such as city streets, entryways, pipelines, container ports, airport tarmacs, bridges, military facility perimeters, chemical plant exterior storage areas, and so on.

For example, the system provides policy-based sensing and surveillance. Policy-based sensing and surveillance combines the power of digital signal processing and microprocessors with sensors (such as video cameras) to produce "smart cameras and sensors" that can trigger alarms based on a customer's rules. Thus, only threatening events need to be monitored by personnel. This provides smart, low cost, easy-to-deploy surveillance that reduces network bandwidth requirements and limits the need for fixed installations.

The system, either in collaboration with an appliance described above or standing alone, expands the abilities of traditional smart cameras and sensors and expands the uses for smart monitoring and surveillance. Embodiments of the system can be configured to provide expanded capabilities that include a multi-spectral input capability that collects information from a wide variety of devices, such as traditional video cameras, near-infrared sources, infrared, acoustic, and thermal sensors, thermal imaging devices, biometric sensors, or other sensors. The system can include analysis capabilities that create alarm policies for each input device with a variety of alarm outputs ranging from an RFID tag to a physical response, such as closing a gate or locking up a facility. The system can be configured to place the analysis functions at a sensor location, eliminating the need for high-bandwidth networks to support a device. This may expand the number of environments in which the system may be effectively deployed, because subsets of the sensor and video information may be transmitted over wireless networks.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device, or personal computer. Those skilled in the relevant art will appreciate that aspects of the invention can be practiced with other communications, data processing, or computer system configurations, including Internet appliances, hand-held devices (including PDAs), wearable computers, all manner of cellular or mobile phones, multiprocessor systems, microprocessor-based or programmable consumer electronics, set-top boxes, network PCs, mini-computers, mainframe computers, and the like. Indeed, the terms "computer," "server," "host," "host system," and the like are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a LAN, WAN, or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the system in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in their implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A mobile, integrated communications system for establishing a self-supported broadband communications network, the system comprising:
    a housing capable of being carried by personnel;
    a plurality of commercial off-the-shelf components contained in the housing and coupled together and configured to provide the broadband communications network;
    a plurality of support members disposed in the housing and configured to support the plurality of commercial off-the-shelf components and to move between a stowed position and a pulled-out position;
    a software management system in the housing and operatively coupled to the plurality of commercial off-the-shelf components;
    a network connection subsystem defined by at least a first portion of the plurality of commercial off-the-shelf components and the software management system and configured to establish access to the broadband communications network; and
    a connection subsystem defined by at least a second portion of the plurality of commercial off-the-shelf components and that provides a user with a connection to the broadband communications network via the network connection subsystem;
    wherein the network connection subsystem is configured to establish access to a second network, and the connection subsystem is configured to allow the user to access the second network via the network connection subsystem; and
    wherein the housing includes one or more rugged cases coupleable together, each of the cases containing portions of the commercial off-the-shelf components.

2. The system of claim 1 wherein the system includes a cooling system coupled to the housing and configured direct airflow directly through at least a portion of the commercial off-the-shelf components.

3. The system of claim 1, further comprising a telephone communication subsystems defined by at least a third portion of the commercial off-the-shelf components and configured to establish access to a remote telephone system.

4. The system of claim 1, further comprising a configuration backup system coupled to the plurality of commercial off-the-shelf components and the software management system, the configuration backup system being configured to determine, store and download a configuration data file of the plurality of commercial off-the-shelf components.

5. A mobile, integrated communications appliance for establishing a self-supported broadband communications network in an environment, the appliance comprising:
    a transportable appliance housing configured to be carried and deployed by personnel;
    a plurality of commercial off-the-shelf communication components contained in the appliance housing and operatively coupled together;
    a plurality of support members disposed in the housing and configured to support the plurality of commercial off-the-shelf communication components and to move between a stowed position and a pulled-out position;
    a management subsystem in the housing and configured to monitor and manage operation of the commercial off-the-shelf communication components;
    a network subsystem defined by at least a second portion of the commercial off-the-shelf communication component, the network subsystem is operatively coupled to the management subsystem and configured to establish a local area network generally proximate to the device;
    a communication subsystem in the housing and configured to allow a user to access the local area network via a wired or wireless connection;
    an interconnection subsystem in the housing that connects the each of the commercial off-the-shelf network components to the management subsystem; and
    wherein the housing includes one or more transportable cases coupleable together to interconnect the commercial off-the-shelf communication components in each of the cases.

6. The appliance of claim 5, further comprising a cooling system connected to the housing and configured direct airflow directly through at least a portion of the commercial off-the-shelf communications components.

7. The appliance of claim 5 wherein the plurality of support members are removably disposed in the housing and configured to support the plurality of commercial off-the-shelf communication components thereon within the housing.

8. The appliance of claim 7 wherein the support members are trays slideably disposed within the housing.

9. The appliance of claim 7 wherein each of the plurality of support members has a connector operatively coupled to the commercial off-the-shelf communication component on the support member, and further comprising a connection assembly operatively coupled to the management subsystem and positioned to engage the connectors of the support members when the members are disposed in the housing to connect the commercial off-the-shelf communication components to the management subsystem.

10. The appliance of claim 5 wherein the plurality of commercial off-the-shelf communication components comprise a power supply, a network switch, a server, and a firewall.

11. The appliance of claim 5 wherein the plurality of commercial off-the-shelf communication components include at least one of a telephone hub, an encryption gateway, and a wireless gateway.

12. The appliance of claim 5, further comprising a power subsystem that provides power to the commercial off-theshelf communication components and the network subsystem, the communication subsystem, and the management subsystem.

13. The appliance of claim 5, further comprising a power subsystem coupled to the commercial off-the-shelf communication components, the power subsystem being configured to provide power to and activate the commercial off-the-shelf communication components upon activation of a single switch by a user.

14. The appliance of claim 5, further comprising a cooling subsystem that regulates the operating temperature of the commercial off-the-shelf communication components with high-velocity airflow.

15. The appliance of claim 5, further comprising a security subsystem that provides security for the commercial off-the-shelf communication components and the management subsystem.

16. The appliance of claim 5, further comprising a wired connection subsystem that provides communications between devices wired to the management subsystem and the network.

17. The appliance of claim 16 wherein the wired connection subsystem comprises an analog phone hub.

18. The appliance of claim 5 wherein the network subsystem is configured to establish access to a second network, and the communication subsystem is configured to allow the user to access the second network via the network subsystem.

19. The appliance of claim 18 wherein the second network is the Internet.

20. The device of claim 5, further comprising a remote subsystem located outside the housing and configured to extend the range of the established local area network.

21. The device of claim 5, further comprising a configuration backup system coupled to the plurality of commercial off-the-shelf components and the software management system, the configuration backup system being configured to determine, store and download a configuration data file of the plurality of commercial off-the-shelf components.

22. A mobile, integrated communications system for establishing a self-supported broadband communications network, the system comprising:
   a transportable appliance housing configured to be carried and deployed by personnel;
   a commercial off-the-shelf server contained in the housing;
   a component management system contained in the housing and coupled to the server;
   a commercial off-the-shelf network switch assembly contained in the housing and coupled to the server and to the software management system;
   a commercial off-the-shelf telephone system contained in the housing and having a telephone hub and telephone software coupled to the network switch and the software management software;
   a commercial off-the-shelf power source in the housing and coupled to the network switch, the server, and the telephone system;
   a commercial off-the-shelf firewall contained in the housing and coupled to the network switch;
   a commercial off-the-shelf wireless gateway coupled to the component management system;
   an encryption gateway coupled to the network switch;
   wherein the appliance housing comprises a plurality of support members disposed in the appliance housing and configured to support thereon at least one of the server, the component management system, the network switch assembly, the telephone system, the power source, the firewall, the wireless gateway, and the encryption gateway, the support members being configured to move between a stowed position and a pulled-out position; and
   wherein the component management system being configured to monitor and manage operation of the to the network switch, the server, and the telephone system to establish a local area network generally proximate to the appliance.

* * * * *

UNITED STATES PATENT AND TRADEMARK OFFICE
CERTIFICATE OF CORRECTION

| | | |
|---|---|---|
| PATENT NO. | : 7,535,861 B2 | Page 1 of 1 |
| APPLICATION NO. | : 11/544224 | |
| DATED | : May 19, 2009 | |
| INVENTOR(S) | : Ampy Buchholz et al. | |

It is certified that error appears in the above-identified patent and that said Letters Patent is hereby corrected as shown below:

On Title page, in Item [75] in column 1, under "Inventors", line 7, Delete "Portland, OR" and insert -- Beaverton, OR --, therefor.

In column 4, line 2, delete "removeable" and insert -- removable --, therefor.

In column 6, line 6, delete "Plug-ins," and insert -- Plug-Ins, --, therefor.

In column 12, line 24, delete "removeably" and insert -- removably --, therefor.

In column 20, line 49, in Claim 8, delete "slideably" and insert -- slidably --, therefor.

In column 20, line 56, in Claim 9, before "members" insert -- support --.

In column 21, line 37, in Claim 21, after "store" insert -- , --.

In column 22, line 33, in Claim 22, after "operation" delete "of the".

Signed and Sealed this

Twenty-fifth Day of May, 2010

David J. Kappos
*Director of the United States Patent and Trademark Office*